US006970997B2

United States Patent
Shibayama et al.

(10) Patent No.: US 6,970,997 B2
(45) Date of Patent: Nov. 29, 2005

(54) PROCESSOR, MULTIPROCESSOR SYSTEM AND METHOD FOR SPECULATIVELY EXECUTING MEMORY OPERATIONS USING MEMORY TARGET ADDRESSES OF THE MEMORY OPERATIONS TO INDEX INTO A SPECULATIVE EXECUTION RESULT HISTORY STORAGE MEANS TO PREDICT THE OUTCOME OF THE MEMORY OPERATION

(75) Inventors: Atsufumi Shibayama, Tokyo (JP); Satoshi Matsushita, Tokyo (JP); Sunao Torii, Tokyo (JP); Naoki Nishi, Tokyo (JP)

(73) Assignee: NEC Corporation, Tokyo (JP)

( * ) Notice: Subject to any disclaimer, the term of this patent is extended or adjusted under 35 U.S.C. 154(b) by 421 days.

(21) Appl. No.: 10/151,819

(22) Filed: May 22, 2002

(65) Prior Publication Data

US 2002/0178349 A1 Nov. 28, 2002

(30) Foreign Application Priority Data

May 23, 2001 (JP) .......................................... 2001-154113

(51) Int. Cl.$^7$ ............................................. G06F 15/00
(52) U.S. Cl. .................. 712/225; 712/219; 712/238
(58) Field of Search ................................. 712/239, 240, 712/235, 216, 217, 218, 219, 225, 238

(56) References Cited

U.S. PATENT DOCUMENTS

| 5,509,135 | A | * | 4/1996 | Steely, Jr. ................... 711/147 |
| 5,615,350 | A | * | 3/1997 | Hesson et al. .............. 712/218 |
| 5,625,835 | A | | 4/1997 | Ebcioglu et al. |

(Continued)

FOREIGN PATENT DOCUMENTS

| EP | 0 709 770 A2 | 5/1996 |
| JP | 5-224927 | 9/1993 |
| JP | 10-171653 | 6/1998 |
| JP | 11-504458 | 4/1999 |
| JP | 11-212788 | 8/1999 |
| JP | P3096423 | 8/2000 |

OTHER PUBLICATIONS

Moshovos, Andreas, and Sohi, Gurindar S. Streamlining Inter-operation Memory Communication via Data Dependence Prediction. IEEE, 1997.*

(Continued)

*Primary Examiner*—Eddie Chan
*Assistant Examiner*—Brett Buehl
(74) *Attorney, Agent, or Firm*—Foley & Lardner LLP

(57) ABSTRACT

When a processor executes a memory operation instruction by means of data dependence speculative execution, a speculative execution result history table which stores history information concerning success/failure results of the speculative execution of memory operation instructions of the past is referred to and thereby whether the speculative execution will succeed or fail is predicted. In the prediction, the target address of the memory operation instruction is converted by a hash function circuit into an entry number of the speculative execution result history table (allowing the existence of aliases), and an entry of the table designated by the entry number is referred to. If the prediction is "success", the memory operation instruction is executed in out-of-order execution speculatively (with regard to data dependence relationship between the instructions). If the prediction is "failure", the speculative execution is canceled and the memory operation instruction is executed later in the program order non-speculatively. Whether the speculative execution of the memory operation instructions has succeeded or failed is judged by detecting the data dependence relationship between the memory operation instructions, and the speculative execution result history table is updated taking the judgment into account.

24 Claims, 12 Drawing Sheets

U.S. PATENT DOCUMENTS

| | | | |
|---|---|---|---|
| 5,742,805 A | | 4/1998 | Kulkarni et al. |
| 5,781,752 A | | 7/1998 | Moshovos et al. |
| 5,896,529 A | | 4/1999 | Kulkarni et al. |
| 5,913,059 A | * | 6/1999 | Torii .................... 718/104 |
| 5,987,588 A | | 11/1999 | Popescu et al. |
| 5,987,595 A | * | 11/1999 | Yoaz et al. .............. 712/216 |
| 6,055,629 A | | 4/2000 | Kulkarni et al. |
| 6,108,770 A | | 8/2000 | Chrysos et al. |
| 6,415,380 B1 | | 7/2002 | Sato |

OTHER PUBLICATIONS

McFarling, Scott. Combining Branch Predictors. WRL Technical Note TN-36. Western Research Laboratory, Jun. 1993.*

Boothe, Bob, and Ranade, Abhiram. Improved multithreading techniques for hiding communication latency in multiprocessors. International Conference on Computer Architecture. ACM Press, 1992.*

Calder, Brad, and Reiman, Glen. Predictive Techniques for Aggresive Load Speculation. IEEE, 1998.*

Chrysos, George Z., and Fisher, Joel S. Memory Dependence Prediction using Store Sets. Digital Equipment Corporation. IEEE, 1998.*

Moshovos, Breach, Vijaykumar, and Sohi. Dynamic Speculation and Synchronization of Data Dependences. University of Wisconsin—Madison. ACM, 1997.*

Theobald, Gao, and Hendren. Speculative Execution and Branch Prediction on Parallel Machines. McGill University School of Computer Science. ACM, 1993.*

Kazi, Iffat H., and Lilja, David J. Coarse–Grained Speculative Execution in Shared–Memory Multiprocessors. Department of Electrical and Computer Engineering, University of Minnesota. ACM, 1998.*

T. Sato, "Load Value Prediction Using Reference Address Renaming," 1998 Parallel Processing Symposium, JSPP 1998, Information Processing Society of Japan, pp. 15–22.

* cited by examiner

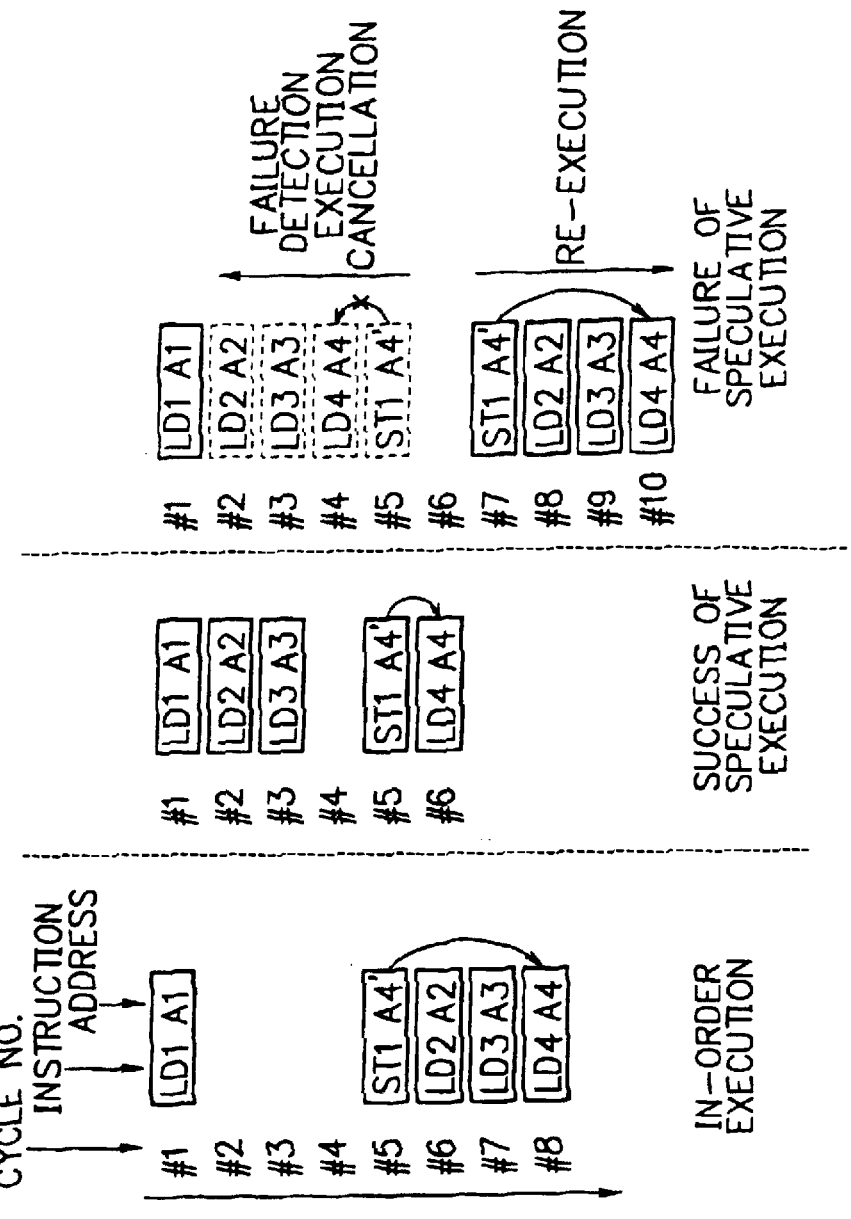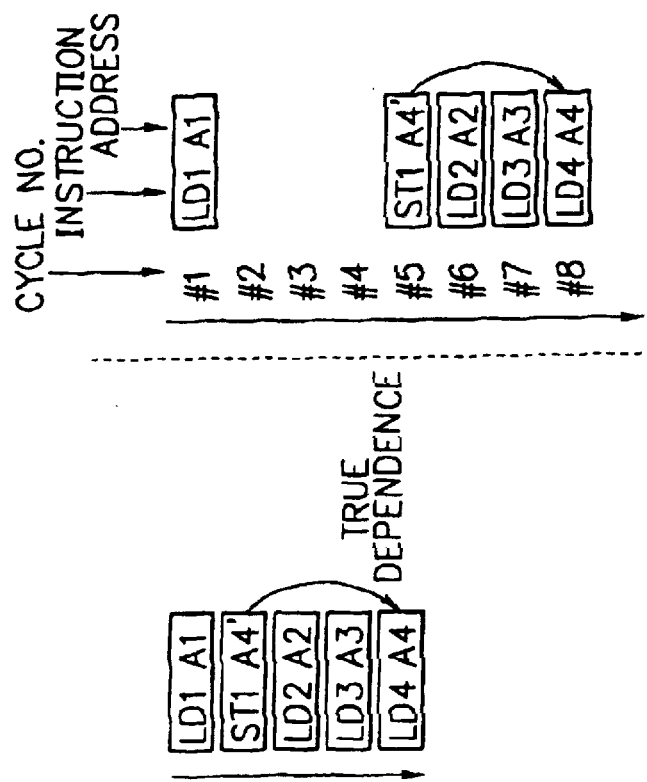

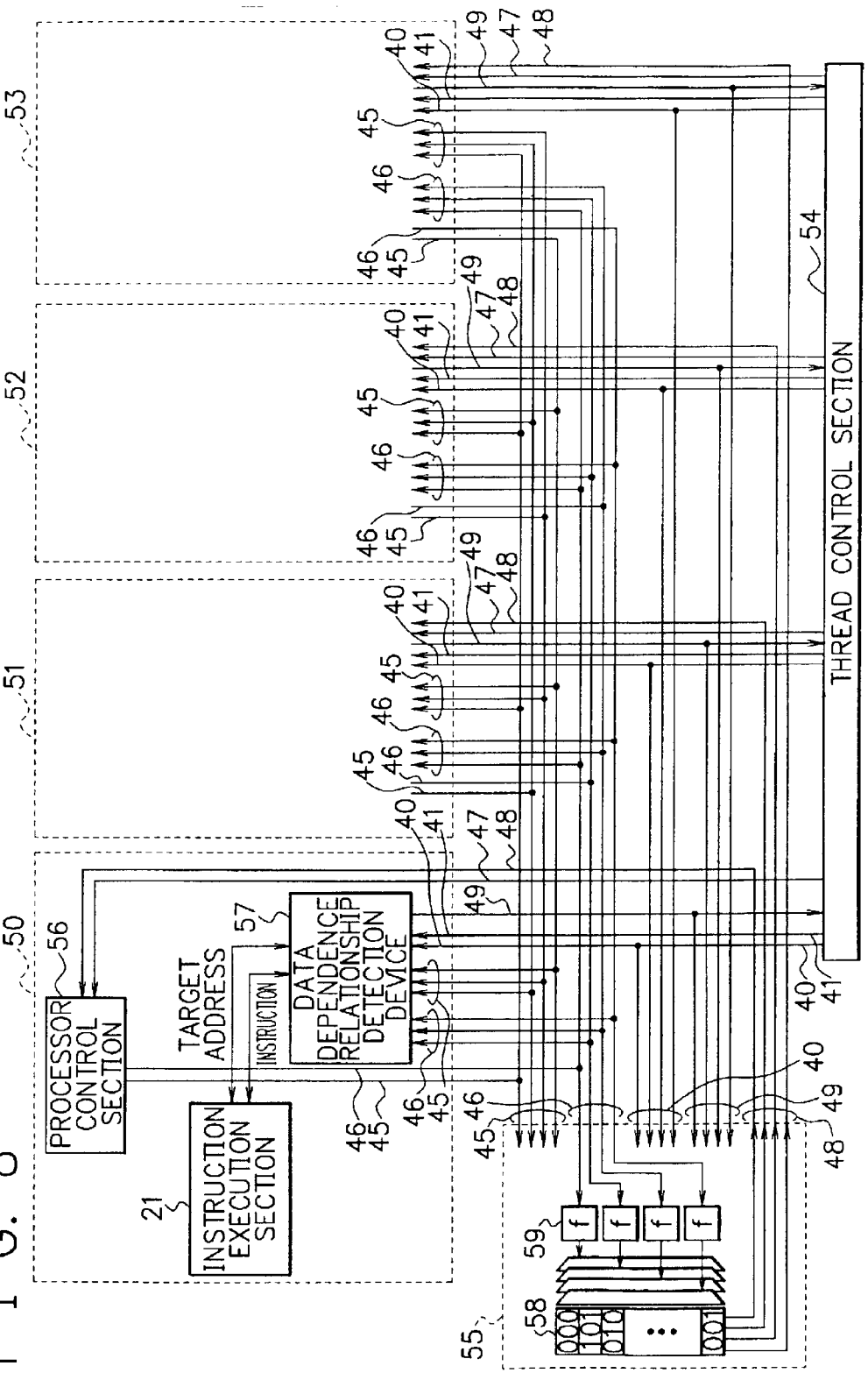

F I G. 9
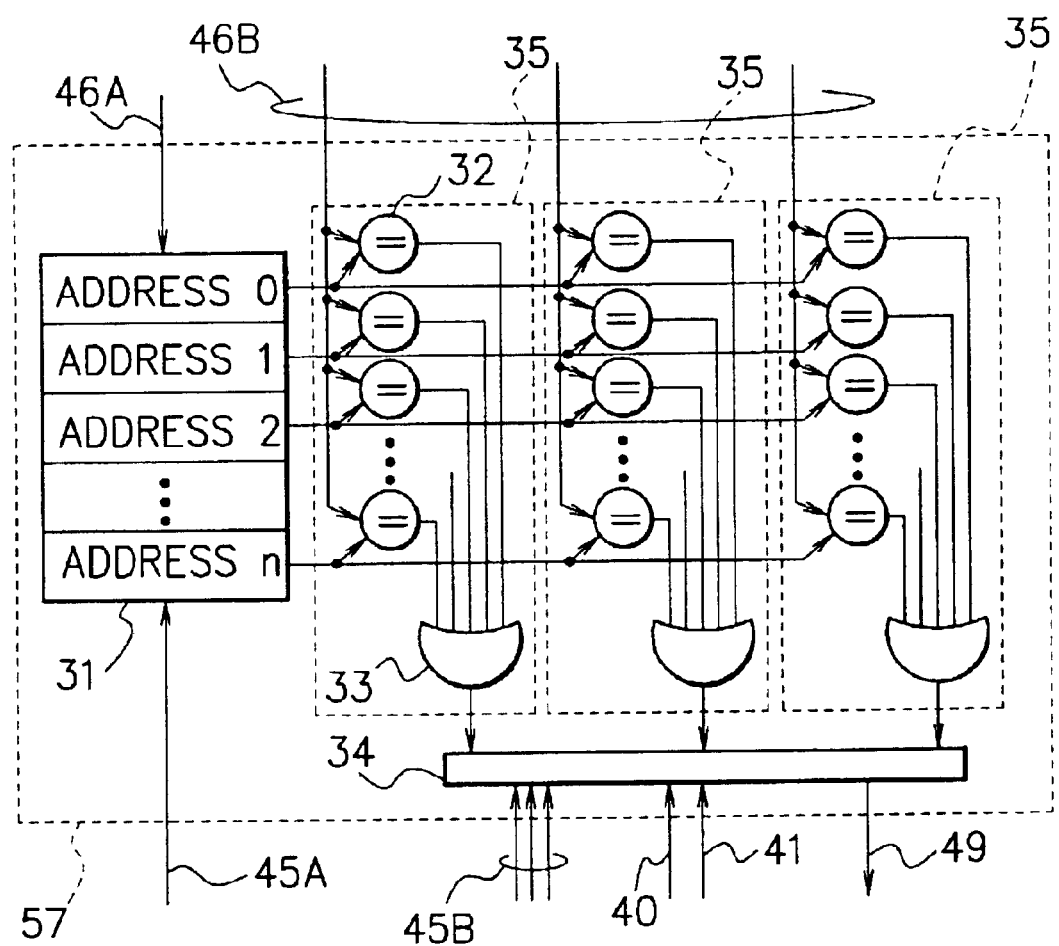

F I G. 11
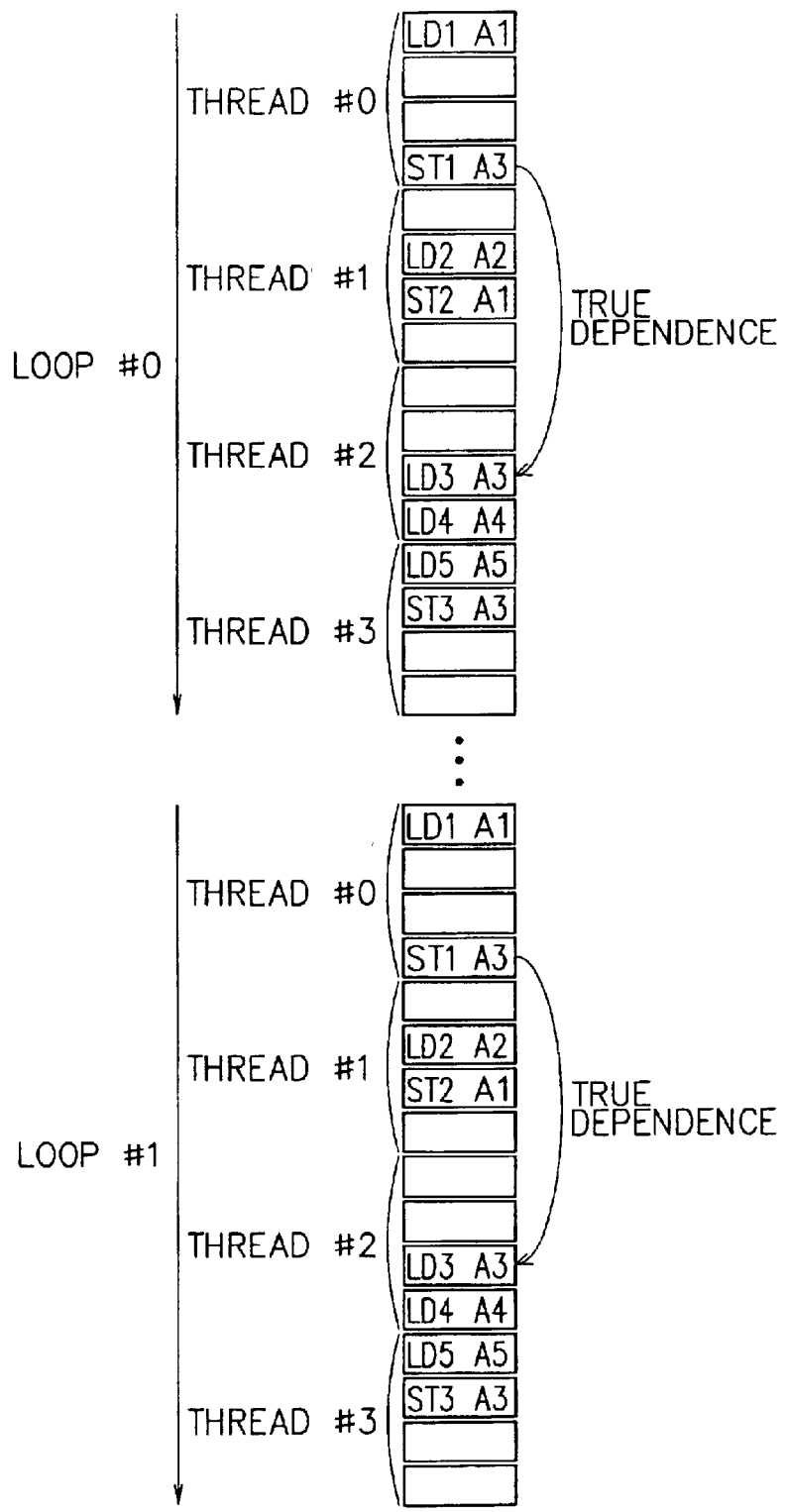

PROCESSOR, MULTIPROCESSOR SYSTEM AND METHOD FOR SPECULATIVELY EXECUTING MEMORY OPERATIONS USING MEMORY TARGET ADDRESSES OF THE MEMORY OPERATIONS TO INDEX INTO A SPECULATIVE EXECUTION RESULT HISTORY STORAGE MEANS TO PREDICT THE OUTCOME OF THE MEMORY OPERATION

BACKGROUND OF THE INVENTION

The present invention relates to a processor and a multiprocessor system having a data dependence speculation execution function, and a data dependence speculation execution method for improving the performance of microprocessors of data processing devices.

DESCRIPTION OF THE RELATED ART

Out-of-order (non-program-order) execution techniques, that allow a miroprocessor to execute instructions of a program in an order that is different from the "program order" (the order of instructions in the program), have widely been known and used for improving the performance of microprocessors. In the out-of-order execution, the processor executes instructions that are currently executable or that become executable even if there exists other instructions that are prior to the instructions in the program order and that are not yet executable. Therefore, by use of the out-of-order execution, the performance of the processor can be improved in comparison with "in-order execution" (program-order execution) in which the instructions are executed in the program-order.

However, the out-of-order execution can not be used unconditionally. As a first necessary condition for enabling the out-of-order execution, there should be no "true dependence relationship (read-after-write relationship) with regard to registers" between the instructions to be executed. For example, when an instruction "B" refers to a register that is altered (i.e. whose value is altered) by another instruction "A" that is prior to the instruction B in the program order, the case (dependence relationship) is called "true dependence of the (prior) instruction A on the (posterior) instruction B with regard to registers".

In such cases, if the two instructions A and B are executed in inverse order relative to the program order, the meaning of the program becomes different from the original meaning and thereby it becomes impossible to obtain a correct program execution result. In short, the program can not be executed in the out-of-order execution if there is a true dependence relationship with regard to registers.

When an instruction "B" alters (the value of) a register that is referred to by another instruction "A" that is prior to the instruction B in the program order, the case (dependence relationship) is called "anti-dependence relationship (write-after-read relationship) of the (prior) instruction A on the (posterior) instruction B with regard to registers".

When an instruction "B" alters a register that is also altered by another instruction "A" that is prior to the instruction B in the program order, the case (dependence relationship) is called "output dependence of the (prior) instruction A on the (posterior) instruction B with regard to registers".

In all cases, if the two instructions A and B are executed in inverse order relative to the program order, the meaning of the program is changed and the correct program execution result can not be obtained.

Generally, which registers should be altered or referred to by instructions becomes clear when the instructions are decoded. Therefore, the out-of-order execution is usually avoided if there are dependence relationships between instructions. For the anti-dependence relationship and the output dependence relationship with regard to registers, techniques for enabling the out-of-order execution by eliminating the dependence relationships by means of register renaming etc. are widely known and used.

As for memory operation instructions that are used for the operation of memory, consideration for "dependence relationships with regard to memory" (in addition to the dependence relationships with regard to registers) becomes necessary for the use of the out-of-order execution.

The memory operation instructions generally include load instructions (for reading data from memory) and store instructions (for writing data to memory). When read/write target addresses of two load/store instructions included in a program are different from each other, the instructions carry out reading/writing to different places (addresses) of the memory, therefore, the two load/store instructions have no dependence relationship with regard to memory, that is, it is possible to execute the two instructions in the out-of-order execution.

On the other hand, when read/write target addresses of two-load/store instructions included in a program are the same, the reading/writing by the two instructions are carried out to the same position (address) of the memory, and thus there is a dependence relationship between the two load/store instructions with regard to memory.

For example, when a load instruction "B" reads data from an address to which data is written by a store instruction "A" that is prior to the instruction B in the program order, the case (dependence relationship) is called "true dependence of the (prior) store instruction A on the (posterior) load instruction B with regard to memory".

In such cases, if the two load/store instructions A and B are executed in inverse order relative to the program order, the meaning of the program becomes different and the correct program execution result can not be obtained. In short, the program can not be executed in the out-of-order execution if there is a true dependence relationship with regard to memory.

Similarly, when a store instruction "B" writes data to an address from which data is read by a load instruction "A" that is prior to the instruction B in the program order, the case (dependence relationship) is called "anti-dependence of the (prior) load instruction A on the (posterior) store instruction B with regard to memory".

Further, when a store instruction "B" writes data to an address to which data is also written by a store instruction "A" that is prior to the instruction B in the program order, the case (dependence relationship) is called "output dependence of the (prior) store instruction A on the (posterior) store instruction B with regard to memory".

In all cases, if the two load/store instructions A and B are executed in inverse order relative to the program order, the meaning of the program is changed and thereby it becomes impossible to obtain the correct program execution result.

For the anti-dependence relationship and the output dependence relationship with regard to memory, techniques for enabling the out-of-order execution by eliminating the dependence relationship (by temporarily storing the data (to be written by the store instruction) in a buffer, for example) are widely known.

On the other hand, when there is a true dependence relationship with regard to memory, the out-of-order execution is essentially impossible and, thus, the program has to be executed in the in-order execution (program-order execution). However, in many cases, the target address of a load/store instruction is unknown until the execution of the instruction. That is, different from the true dependence relationship with regard to registers (in which the dependence relationship becomes clear at the stage of instruction decoding), the dependence relationships with regard to memory do not become clear in many cases until instruction execution. The impossibility of the out-of-order execution in such cases may have significant negative effects on performance.

A concrete example will be explained referring to FIGS. 1A through 1D. FIG. 1A shows the program order of a program that is composed of load/store instructions. The program order of FIG. 1A includes a load instruction LD1 for a target address A1, a store instruction ST1 for a target address A4', a load instruction LD2 for a target address A2, a load instruction LD3 for a target address A3, and a load instruction LD4 for a target address A4.

If we assume that the target address A4' of the store instruction ST1 is the same as the target address A4 of the load instruction LD4 (A4'=A4), there exists the true dependence of the store instruction ST1 on the load instruction LD4 with regard to memory (since the store instruction ST1 is prior to the load instruction LD4 in the program order and the two instructions ST1 and LD4 have the same target address).

In the original meaning of the program, the load instruction LD1 is supposed to make access to the target address A4 (=A4') and read out data (that has been written to the address by the store instruction ST1) from the target address A4 (=A4'). Therefore, the store instruction ST1 has to be executed prior to the load instruction LD4.

FIG. 1B shows an example of the in-order execution (program order execution) of the instructions of FIG. 1A. Starting from the left, each row of FIG. 1B includes a cycle number, an instruction to be executed in the cycle, and the target address of the executed instruction. If we assume that the target address A4' of the store instruction ST1 will not be known until the cycle #5, then the load instruction LD1 for the target address A1 is executed in the cycle #1, the store instruction ST1 for the target address A4' is executed in the cycle #5, the load instruction LD2 for the target address A2 is executed in the cycle #6, the load instruction LD3 for the target address A3 is executed in the cycle #7, and the load instruction LD4 for the target address A4 is executed in the cycle #8.

Even if the target address A2, A3 or A4 is already known in the cycle #2, #3 or #4 before the cycle #5, the out-of-order execution (execution of the load instruction LD2, LD3 or LD4 prior to the store instruction ST1) is impossible since the presence/absence of the true dependence relationship of the store instruction ST1 on the load instructions LD1, LD2, LD3 or LD4 will not become clear until the cycle #5 (since the target address A4' of the store instruction ST1 will not be known until the cycle #5 as mentioned above).

Therefore, in the in-order execution example of FIG. 1B, no load/store instruction can be executed in the cycles #2, #3 and #4, thereby eight cycles become necessary for the execution of the five instructions LD1, LD2, LD3, LD4 and ST1.

As explained above, if the out-of-order execution of load/store instructions is prohibited, the program execution performance is necessitated to be degraded. As a method for resolving the problem, a speculative execution method has been known. In the speculative execution method, the out-of-order execution is carried out in a speculative manner before the presence/absence of the true dependence relationship becomes clear, on the assumption that no true dependence relationship exists. Such speculative instruction execution with regard to the true data dependence relationship will hereafter be called "data dependence speculative execution".

The data dependence speculative execution can cause two results: the success of the speculative execution (due to the absence of the true dependence relationship) and the failure of the speculative execution (due to the presence of the true dependence relationship), therefore, judgment on whether the result is success or failure becomes necessary at the point when the presence/absence of the true dependence relationship becomes clear. If no true dependence relationship existed and thereby the speculative execution is judged to have succeeded, subsequent instruction execution can be continued without stop and thereby the program execution performance can be improved thanks to the out-of-order execution by means of the data dependence speculative execution.

On the other hand, if a true dependence relationship actually existed and thereby the speculative execution is judged to have failed, the meaning of the program becomes different from the original meaning and thereby it becomes impossible to ensure a correct program execution result. In such cases, a recovery process for the failure of the data dependence speculative execution (cancellation of the result of the out-of-order execution by the data dependence speculative execution and re-execution of the program in the in-order execution) becomes necessary.

In the case where the speculative execution failed, the cancellation of the failed instructions and the recovery process generally take long time and thereby the program execution performance is more degraded than the case of the in-order execution. However, if the probability of success of the speculative execution is high enough, overall improvement of the program execution performance can be expected.

Incidentally, the out-of-order execution has been elaborated on in a document: Mike Johnson "Superscalar Processor", Nikkei BP publication center (1994). The data dependence speculative execution and the recovery process for the speculative execution failure have been disclosed in, for example, Japanese Patent Application Laid-Open No. HEI5-224927 and Japanese Patent No. 3096423.

A concrete example of the data dependence speculative execution will be explained referring to FIG. 1C. FIG. 1C shows an example of the success of the data dependence speculative execution for the program of FIG. 1A. Similarly to the in-order execution of FIG. 1B, it is assumed that the target address A4' of the store instruction ST1 will not be known until the cycle #5. The target address A2 of the load instruction LD2, the target address A3 of the load instruction LD3 and the target address A4 of the load instruction LD4 are assumed to become known in the cycles #2, #3 and #6, respectively.

First, the load instruction LD1 for the target address A1 is executed in the cycle #1. In the next cycle #2, the store instruction ST1 should be executed according to the program order (see FIG. 1A), however, the store instruction ST1 can not be executed since the target address A4' is unknown yet. Therefore, the load instruction LD2 whose target address A2 is already known is executed prior to the store instruction ST1 in the out-of-order execution.

At this point, the target address A4' of the store instruction ST1 is still unknown, and thus the presence/absence of the true dependence relationship of the store instruction ST1 on the load instruction LD2 is also unknown. Therefore, the execution of the load instruction LD2 prior to the execution of the store instruction ST1 is carried out by means of the data dependence speculative execution.

Similarly, in the cycle #3, the store instruction ST1 is still not executable, and thus the load instruction LD3 whose target address A2 is already known is executed by means of the data dependence speculative execution. At this point, the presence/absence of the true dependence relationship of the store instruction ST1 on the load instruction LD3 is also unknown since the target address of the store instruction ST1 is still unknown.

In the cycle #4, neither the instruction ST1 nor LD4 has a target address that became clear, therefore, neither instruction can be executed.

In the next cycle #5, the target address A4' of the store instruction ST1 becomes clear and thereby the instruction ST1 is executed. At the same time, the presence/absence of the true dependence relationships of the store instruction ST1 on the load instructions LD2 and LD3 (to which the data dependence speculative execution has been carried out) is judged.

In this case, no true dependence relationship (on the load instruction LD2 or LD3) exists since the target addresses A2 and A3 of the load instructions LD2 and LD3 are different from the target address A4' of the store instruction ST1, therefore, the data dependence speculative execution for the load instructions LD2 and LD3 is judged to have succeeded. Since the data dependence speculative execution has succeeded, subsequent instruction execution can be continued without stop. Thereafter, the load instruction LD4 (whose target address A4 becomes clear in the cycle #6) is executed in the cycle #6. The store instruction ST1 has the true dependence relationship on the load instruction LD4, however, no problem occurs since the instructions ST1 and LD4 are executed in the program order. Above is an example of the success of the data dependence speculative execution.

As above, in the case of FIG. 1C where the out-of-order execution by means of the data dependence speculative execution succeeded, the program execution is completed in only six cycles (shorter than eight cycles required by the in-order execution of FIG. 1B) and thereby the program execution performance is improved.

On the other hand, FIG. 1D shows an example of the failure of the data dependence speculative execution for the program of FIG. 1A. Similarly to the in-order execution of FIG. 1B, it is assumed that the target address A4' of the store instruction ST1 will not be known until the cycle #5. The target address A2 of the load instruction LD2, the target address A3 of the load instruction LD3 and the target address A4 of the load instruction LD4 are assumed to become known in the cycles #2, #3 and #4, respectively.

First, the load instruction LD1 for the target address A1 is executed in the cycle #1. Subsequently, similarly to the case of success of data dependence speculative execution shown in FIG. 1C, the store instruction ST1, that should be executed next according to the program order, can not be executed in the cycles #2 and #3 since its target address A4' is still unknown. Therefore, the load instructions LD2 and LD3 whose target addresses are already known are executed in the cycles #2 and #3 in the out-of-order execution by use of the data dependence speculative execution.

In the cycle #4, the target address A4' of the store instruction ST1 is still unknown but the target address A4 of the load instruction LD4 is known, therefore, the load instruction LD4 is executed by means of the data dependence speculative execution.

In the cycle #5, the target address A4' of the store instruction ST1 becomes clear, thereby the store instruction ST1 is executed. At the same time, the presence/absence of the true dependence relationships of the store instruction ST1 on the load instructions LD2, LD3 and LD4 (to which the data dependence speculative execution has been carried out) is judged.

In this case, no true dependence relationship on the load instruction LD2 or LD3 exists since the target addresses A2 and A3 of the load instructions LD2 and LD3 are different from the target address A4' of the store instruction ST1. However, there exists a true dependence relationship of the store instruction ST1 on the load instruction LD4 since the target address A4 of the load instruction LD4 is the same as the target address A4' of the store instruction ST1.

In other words, the out-of-order execution of the load instruction LD4 (prior to the execution of the store instruction ST1) was (erroneously) carried out although the true dependence relationship existed. Therefore, the data dependence speculative execution of the load instruction LD4 is judged to have failed. In this case, a correct program execution result can not be ensured if subsequent instruction execution is continued without stop, therefore, the aforementioned recovery process for the data dependence speculative execution failure has to be conducted.

In the example of FIG. 1D, when the data dependence speculative execution is judged to have failed in the cycle #5, the execution results of the instructions LD2, LD3, LD4 (which have been executed in the cycles #2, #3 and #4 by the data dependence speculative execution) and ST1 (which has been executed in the cycle #5) are canceled first. Subsequently, the recovery process for the data dependence speculative execution failure is carried out by re-executing the instructions ST1, LD2, LD3 and LD4 (relating to the cancellation) in the in-order execution starting from the cycle #7. Thereafter, the execution of subsequent instructions is started.

In this example, the execution of the five instructions LD1, LD2, LD3. LD4 and ST1 needed as long as ten cycles, thereby the program execution performance gets lower than the in-order execution of FIG. 1B which required eight cycles. However, the program would have been completed in only six cycles if the data dependence speculative execution succeeded as in FIG. 1C. Therefore, if the probability of success of the speculative execution is higher than that of failure, overall improvement of the program execution performance can be expected.

As discussed above, in order to let the processor carry out the data dependence speculative execution, a function for judging the presence/absence of the true dependence relationship with regard to memory among load/store instructions becomes necessary. As a device for implementing the judgment function, there have been proposed some data dependence relationship detection devices, such as an address comparator disclosed in Japanese Patent No. 3096423.

In the following, an example of the data dependence speculative execution that is executed by a processor having a data dependence relationship detection device will be explained.

FIG. 2 is a block diagram showing an example of the composition of a processor that is provided with a data dependence relationship detection device for detecting true dependence relationships among load/store instructions. The processor of FIG. 2 includes a processor control section 120, an instruction execution section 121, and a data dependence relationship detection device 130. The data dependence relationship detection device 130 is composed of a plurality of address buffers 131 for storing target addresses of load instructions, a plurality of address comparators 132 each of which is connected to each address buffer 131, and an OR (logical sum) circuit 133 to which the outputs of all the address comparators 132 are inputted.

Each address comparator 132 compares a target address stored in a corresponding address buffer 131 with a target address of a store instruction that is being executed. The OR circuit 133 obtains the logical sum (OR) of the outputs of all the address comparators 132 and outputs the logical sum as a data dependence detection result 116.

When an instruction is executed by the processor of FIG. 2, the instruction execution section 121 and the data dependence relationship detection device 130 receive information on the instruction (instruction 115) from the processor control section 120 and thereby recognize the type of the instruction to be executed. If the instruction to be executed is a memory operation instruction, the processor control section 120 informs the instruction execution section 121 and the data dependence relationship detection device 130 about the target address 114 of the instruction. Further, when a memory operation instruction is executed by means of the data dependence speculative execution, the processor control section 120 informs the data dependence relationship detection device 130 of the fact by use of a speculative execution flag 113.

The detection of the true dependence relationship of a store instruction on a load instruction with regard to memory is executed by the data dependence relationship detection device 130 as follows. In a state where the processor carries out no speculative instruction execution with regard to the data dependence relationships and executes the instructions non-speculatively in the in-order execution (hereafter called "non-speculative execution state"), the data dependence relationship detection device 130 carries out no process.

In a state where the processor carries out speculative instruction execution with regard to the data dependence relationships (hereafter called "speculative execution state"), the data dependence relationship detection device 130 carries out a process for detecting a true dependence relationship of a store instruction on a load instruction. Whether the processor is in the non-speculative execution state or the speculative execution state is judged based on the speculative execution flag 113 which is supplied from the processor control section 120 to the data dependence relationship detection device 130. When a load instruction is executed by means of the data dependence speculative execution, the target address of the load instruction is stored in an address buffer 131 that is idle (storing no target address).

Thereafter, when a store instruction is executed, the target address of the store instruction is inputted to all the address comparators 132, thereby the target address of the store instruction is compared with the target addresses (that have been stored in the address buffers 131) of the load instructions that have been carried out by means of the data dependence speculative execution. The results of the comparisons are logically summed up by the OR circuit 133, and the logical sum (OR) is supplied to the processor control section 120 as the data dependence detection result 116.

If the store instruction target address matched none of the load instruction target addresses stored in the address buffers 131, the store instruction can be judged to have no true dependence relationship on the load instructions (whose target addresses have been stored in the address buffers 131), thereby the fact is given to the processor control section 120 as the data dependence detection result 116. In this case, the data dependence speculative execution is regarded to have succeeded and the following instruction execution can be continued without stop.

On the other hand, if the store instruction target address matched one or more of the load instruction target addresses stored in the address buffers 131, the store instruction can be judged to have one or more true dependence relationships on the load instructions (whose target addresses have been stored in the address buffers 131), thereby the fact is given to the processor control section 120 as the data dependence detection result 116. In this case, the data dependence speculative execution is regarded to have failed, and thus the recovery process for the failure of the data dependence speculative execution is carried out.

As techniques for improving the success rate of the speculative execution by hardware, there have been proposed branch prediction techniques for branch speculative execution. For example, in a device and method for branch prediction which have been disclosed in Japanese Patent Application Laid-Open No. HEI10-171653, weight information which is used for the branch prediction is updated for each program to be executed, based on learning information (composed of history information with regard to previous branches) and correct answer information (composed of the result of the current branch), and the branch prediction for the next branch is conducted using the updated weight information.

In addition, International Publication No. WO97/30389 (Published Japanese Translations of PCT International Publication for Patent Applications No. HEI11-504458) discloses a device for predicting the branching directions of conditional branch instructions in a superscalar microprocessor. The device predicts the branching direction by referring to a history register which stores history records of previous branching processes that have actually been executed.

However, the conventional data dependence speculative execution which has been explained above has a problem of causing the degradation of the program execution performance (due to the recovery process for the data dependence speculative execution failure) when the probability of the data dependence speculative execution failure is high.

Further, differently from the branch speculative execution (in which the success/failure of the speculative execution becomes clear just after the speculative execution), the success/failure of the data dependence speculative execution becomes clear long after the speculative execution. Therefore, it is difficult to employ the conventional branch prediction devices of Japanese Patent Application Laid-Open No. HEI10-171653 and International Publication No. WO97/30389 for the prediction of the success/failure of the data dependence speculative execution.

SUMMARY OF THE INVENTION

It is therefore the primary object of the present invention to provide a processor, a multi-processor system and a data dependence speculation control method by which the failure rate of the data dependence speculative execution can be reduced and thereby the program execution performance can be improved.

In accordance with a first aspect of the present invention, there is provided a processor having a function for executing memory operation instructions in out-of-order execution by means of speculative execution with regard to dependence relationship between the instructions. The processor comprises address conversion means, speculative execution result history storage means, speculative execution success/failure prediction means, instruction execution means, speculation control means, speculative execution success/failure judgment means, and speculative execution result history update means. The address conversion means converts a target address of the memory operation instruction into a corresponding entry number allowing the existence of aliases. The speculative execution result history storage means stores history information concerning success/failure results of the speculative execution of the memory operation instructions of the past, with regard to each of the entry numbers. The speculative execution success/failure prediction means predicts whether the speculative execution of a memory operation instruction that is going to be carried out will succeed or fail, by referring to an entry of the speculative execution result history storage means corresponding to the entry number that is obtained by the address conversion means for the target address of the memory operation instruction. The instruction execution means executes the memory operation instructions. The speculation control means lets the instruction execution means execute the memory operation instruction in the out-of-order execution by means of the speculative execution if the prediction by the speculative execution success/failure prediction means is success. If the prediction by the speculative execution success/failure prediction means is failure, the speculation control means lets the instruction execution means execute the memory operation instruction in in-order execution by means of non-speculative execution. The speculative execution success/failure judgment means judges whether the speculative execution of the memory operation instructions has succeeded or failed, by detecting the dependence relationship between the memory operation instructions. The speculative execution result history update means updates the history information stored in the speculative execution result history storage means taking the judgment by the speculative execution success/failure judgment means into account.

In accordance with a second aspect of the present invention, in the first aspect, the speculative execution success/failure judgment means judges the success/failure of the speculative execution when a store instruction is executed, by detecting the presence/absence of true dependence relationship of the store instruction on load instructions that are posterior to the store instruction in program order and that have been executed by means of the speculative execution. The speculative execution result history update means increases an index concerning success probability of the speculative execution (as the history information stored in the entry corresponding to the target address of the store instruction) if the speculative execution success/failure judgment means judged that the speculative execution has succeeded. If the speculative execution success/failure judgment means judged that the speculative execution has failed, the speculative execution result history update means decreases the index as the history information.

In accordance with a third aspect of the present invention, in the second aspect, the speculative execution success/failure judgment means detects the presence/absence of the true dependence relationship of the store instruction on the load instructions by comparing the target address of the store instruction with the target addresses of the load instructions that have been stored in address buffers.

In accordance with a fourth aspect of the present invention, in the first aspect, the address conversion means converts the target address into the entry number by extracting predetermined bits from the target address.

In accordance with a fifth aspect of the present invention, in the first aspect, the address conversion means converts the target address into the entry number by executing logical operations to predetermined bits of the target address.

In accordance with a sixth aspect of the present invention, in the first aspect, the address conversion means converts the target address into the entry number by applying XOR operations to predetennined bits of the target address.

In accordance with a seventh aspect of the present invention, there is provided a multiprocessor system including two or more processors for executing parallel processing in units of threads. The multiprocessor system comprises thread assignment means, address conversion means, speculative execution result history storage means, speculative execution success/failure prediction means, speculation control means, speculative execution success/failure judgment means, and speculative execution result history update means. The thread assignment means assigns the threads to the processors so that the threads will be executed by the processors in parallel. The address conversion means converts a target address of a memory operation instruction included in the threads into a corresponding entry number allowing the existence of aliases. The speculative execution result history storage means stores history information concerning success/failure results of speculative execution of the memory operation instructions of the past, with regard to each of the entry numbers. The speculative execution success/failure prediction means predicts whether the speculative execution of a memory operation instruction that is going to be carried out by a processor will succeed or fail by referring to an entry of the speculative execution result history storage means corresponding to the entry number that is obtained by the address conversion means for the target address of the memory operation instruction. The speculation control means lets the processor execute the memory operation instruction in out-of-order execution by means of the speculative execution if the prediction by the speculative execution success/failure prediction means is success. If the prediction by the speculative execution success/failure prediction means is failure, the speculation control means lets the processor execute the memory operation instruction in in-order execution by means of non-speculative execution. The speculative execution success/failure judgment means judges whether the speculative execution of the memory operation instructions has succeeded or failed, by detecting the dependence relationship between the memory operation instructions. The speculative execution result history update means updates the history information stored in the speculative execution result history storage means taking the judgment by the speculative execution success/failure judgment means into account.

In accordance with an eighth aspect of the present invention, in the seventh aspect, each processor includes the speculative execution success/failure judgment means. The speculative execution success/failure judgment means of the processor judges the success/failure of the speculative execution of load instructions that has been carried out by the processor when a store instruction is executed by another processor that is executing a thread that is prior in program order to the thread executed by the processor, by detecting the presence/absence of true dependence relationship of the store instruction on the load instructions. The speculative execution result history update means increases an index concerning success probability of the speculative execution (as the history information stored in the entry corresponding to the target address of the store instruction) if the speculative execution success/failure judgment means judged that the speculative execution has succeeded. If the speculative execution success/failure judgment means judged that the speculative execution has failed, the speculative execution result history update means decreases the index as the history information.

In accordance with a ninth aspect of the present invention, in the eighth aspect, the speculative execution success/failure judgment means of each processor detects the presence/absence of the true dependence relationship of the store instruction on the load instructions by comparing the target address of the store instruction with the target addresses of the load instructions that have been stored in address buffers of the processor.

In accordance with a tenth aspect of the present invention, in the seventh aspect, the address conversion means converts the target address into the entry number by extracting predetermined bits from the target address.

In accordance with an eleventh aspect of the present invention, in the seventh aspect, the address conversion means converts the target address into the entry number by executing logical operations to predetermined bits of the target address.

In accordance with a twelfth aspect of the present invention, in the eleventh aspect, the address conversion means converts the target address into the entry number by applying XOR operations to predetermined bits of the target address.

In accordance with a thirteenth aspect of the present invention, there is provided a data dependence speculative execution method for executing memory operation instructions in out-of-order execution by means of speculative execution with regard to dependence relationship between the instructions. The data dependence speculative execution method comprises an address conversion step, a speculative execution result history storage step, a speculative execution success/failure prediction step, a speculative execution step, a non-speculative execution step, a speculative execution success/failure judgment step, and a speculative execution result history update step. In the address conversion step, a target address of the memory operation instruction is converted into a corresponding entry number allowing the existence of aliases. In the speculative execution result history storage step, history information concerning success/failure results of the speculative execution of the memory operation instructions of the past is stored in history storage means, with regard to each of the entry numbers. In the speculative execution success/failure prediction step, whether the speculative execution of a memory operation instruction that is going to be carried out will succeed or fail is predicted by referring to an entry of the history storage means corresponding to the entry number that is obtained by the address conversion step for the target address of the memory operation instruction. In the speculative execution step, the memory operation instruction is executed in the out-of-order execution by means of the speculative execution if the prediction by the speculative execution success/failure prediction step is success. In the non-speculative execution step, the memory operation instruction is executed in in-order execution by means of non-speculative execution if the prediction by the speculative execution success/failure prediction step is failure. In the speculative execution success/failure judgment step, whether the speculative execution of the memory operation instructions has succeeded or failed is judged by detecting the dependence relationship between the memory operation instructions. In the speculative execution result history update step, the history information stored in the history storage means is updated taking the judgment by the speculative execution success/failure judgment step into account.

In accordance with a fourteenth aspect of the present invention, in the thirteenth aspect, in the speculative execution success/failure judgment step, the success/failure of the speculative execution is judged when a store instruction is executed, by detecting the presence/absence of true dependence relationship of the store instruction on load instructions that are posterior to the store instruction in program order and that have been executed by means of the speculative execution. In the speculative execution result history update step, an index concerning success probability of the speculative execution (as the history information stored in the entry corresponding to the target address of the store instruction) is increased if the speculative execution is judged to have succeeded in the speculative execution success/failure judgment step. If the speculative execution is judged to have failed in the speculative execution success/failure judgment step, the index as the history information is decreased.

In accordance with a fifteenth aspect of the present invention, in the fourteenth aspect, in the speculative execution success/failure judgment step, the presence/absence of the true dependence relationship of the store instruction on the load instructions is detected by comparing the target address of the store instruction with the target addresses of the load instructions that have been stored in address buffers.

In accordance with a sixteenth aspect of the present invention, in the address conversion step in the thirteenth aspect, the target address is converted into the entry number by extracting predetermined bits from the target address.

In accordance with a seventeenth aspect of the present invention, in the address conversion step in the thirteenth aspect, the target address is converted into the entry number by executing logical operations to predetermined bits of the target address.

In accordance with an eighteenth aspect of the present invention, in the address conversion step in the seventeenth aspect, the target address is converted into the entry number by applying XOR operations to predetermined bits of the target address.

In accordance with a nineteenth aspect of the present invention, there is provided a data dependence speculative execution method for executing parallel processing in units of threads by executing memory operation instructions in out-of-order execution by means of speculative execution with regard to dependence relationship between the instructions. The data dependence speculative execution method comprises a thread assignment step, an address conversion step, a speculative execution result history storage step, a speculative execution success/failure prediction step, a speculative execution step, a non-speculative execution step, a speculative execution success/failure judgment step, and a speculative execution result history update step. In the thread assignment step, the threads are assigned to two or more processors so that the threads will be executed by the processors in parallel. In the address conversion step, a target address of the memory operation instruction included in the threads is converted into a corresponding entry number allowing the existence of aliases. In the speculative execution result history storage step, history information concerning success/failure results of the speculative execution of the memory operation instructions of the past is stored in history storage means, with regard to each of the entry numbers. In the speculative execution success/failure prediction step, whether the speculative execution of a memory operation instruction that is going to be carried out by a processor will succeed or fail is predicted, by referring to an entry of the history storage means corresponding to the entry number that is obtained by the address conversion step for the target address of the memory operation instruction. In the speculative execution step, the processor executes the memory operation instruction in the out-of-order execution by means of the speculative execution if the prediction by the speculative execution success/failure prediction step is success. In the non-speculative execution step, the processor executes the memory operation instruction in in-order execution by means of non-speculative execution if the prediction by the speculative execution success/failure prediction step is failure. In the speculative execution success/failure judgment step whether the speculative execution of the memory operation instructions has succeeded or failed is judged, by detecting the dependence relationship between the memory operation instructions. In the speculative execution result history update step, the history information stored in the history storage means is updated taking the judgment by the speculative execution success/failure judgment step into account.

In accordance with a twentieth aspect of the present invention, in the nineteenth aspect, the speculative execution success/failure judgment step is executed for each processor. In the speculative execution success/failure judgment step for a processor, the success/failure of the speculative execution of load instructions that has been carried out by the processor is judged when a store instruction is executed by another processor that is executing a thread that is prior in program order to the thread executed by the processor, by detecting the presence/absence of true dependence relationship of the store instruction on the load instructions. In the speculative execution result history update step, an index concerning success probability of the speculative execution (as the history information stored in the entry corresponding to the target address of the store instruction) is increased if the speculative execution is judged to have succeeded in the speculative execution success/failure judgment step. If the speculative execution is judged to have failed in the speculative execution success/failure judgment step, the index as the history information is decreased.

In accordance with a twenty-first aspect of the present invention, in the twentieth aspect, in the speculative execution success/failure judgment step for each processor, the presence/absence of the true dependence relationship of the store instruction on the load instructions is detected by comparing the target address of the store instruction with the target addresses of the load instructions that have been stored in address buffers of the processor.

In accordance with a twenty-second aspect of the present invention, in the address conversion step in the nineteenth aspect, the target address is converted into the entry number by extracting predetermined bits from the target address.

In accordance with a twenty-third aspect of the present invention, in the address conversion step in the nineteenth aspect, the target address is converted into the entry number by executing logical operations to predetermined bits of the target address.

In accordance with a twenty-fourth aspect of the present invention, in the address conversion step in the twenty-third aspect, the target address is converted into the entry number by applying XOR operations to predetermined bits of the target address.

BRIEF DESCRIPTION OF THE DRAWINGS

The objects and features of the present invention will become more apparent from the consideration of the following detailed description taken in conjunction with the accompanying drawings, in which:

FIG. 1A is a schematic diagram showing the program order of a program that is composed of load/store instructions;

FIG. 1B is a schematic diagram showing an example of in-order execution (program order execution) of the instructions of FIG. 1A;

FIG. 1C is a schematic diagram showing an example of the success of data dependence speculative execution for the program of FIG. 1A;

FIG. 1D is a schematic diagram showing an example of the failure of data dependence speculative execution for the program of FIG. 1A;

FIG. 8 is a block diagram showing the composition of a multiprocessor system including a data dependence speculation control device in accordance with a second embodiment of the present invention;

FIG. 9 is a block diagram showing an example of the composition of a data dependence relationship detection device which is shown in FIG. 8;

FIG. 11 is a schematic diagram showing the program order of instructions that are included in a program as an example;

DESCRIPTION OF THE PREFERRED EMBODIMENTS

Figure 2:
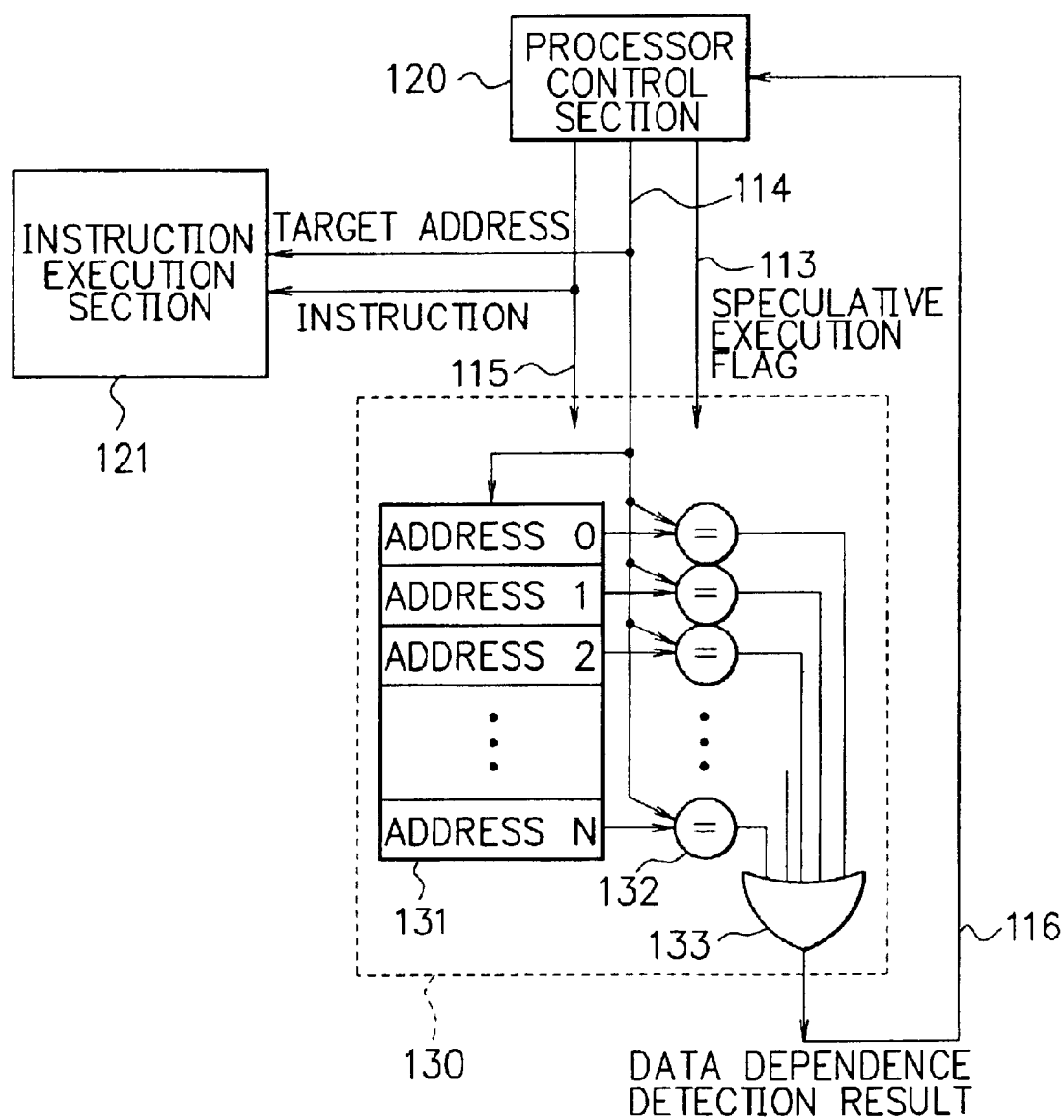
FIG. 2 is a block diagram showing an example of the composition of a processor that is provided with a data dependence relationship detection device for detecting true dependence relationships among load/store instructions.

Referring now to the drawings, a description will be given in detail of preferred embodiments in accordance with the present invention.

Embodiment 1

Figure 3:
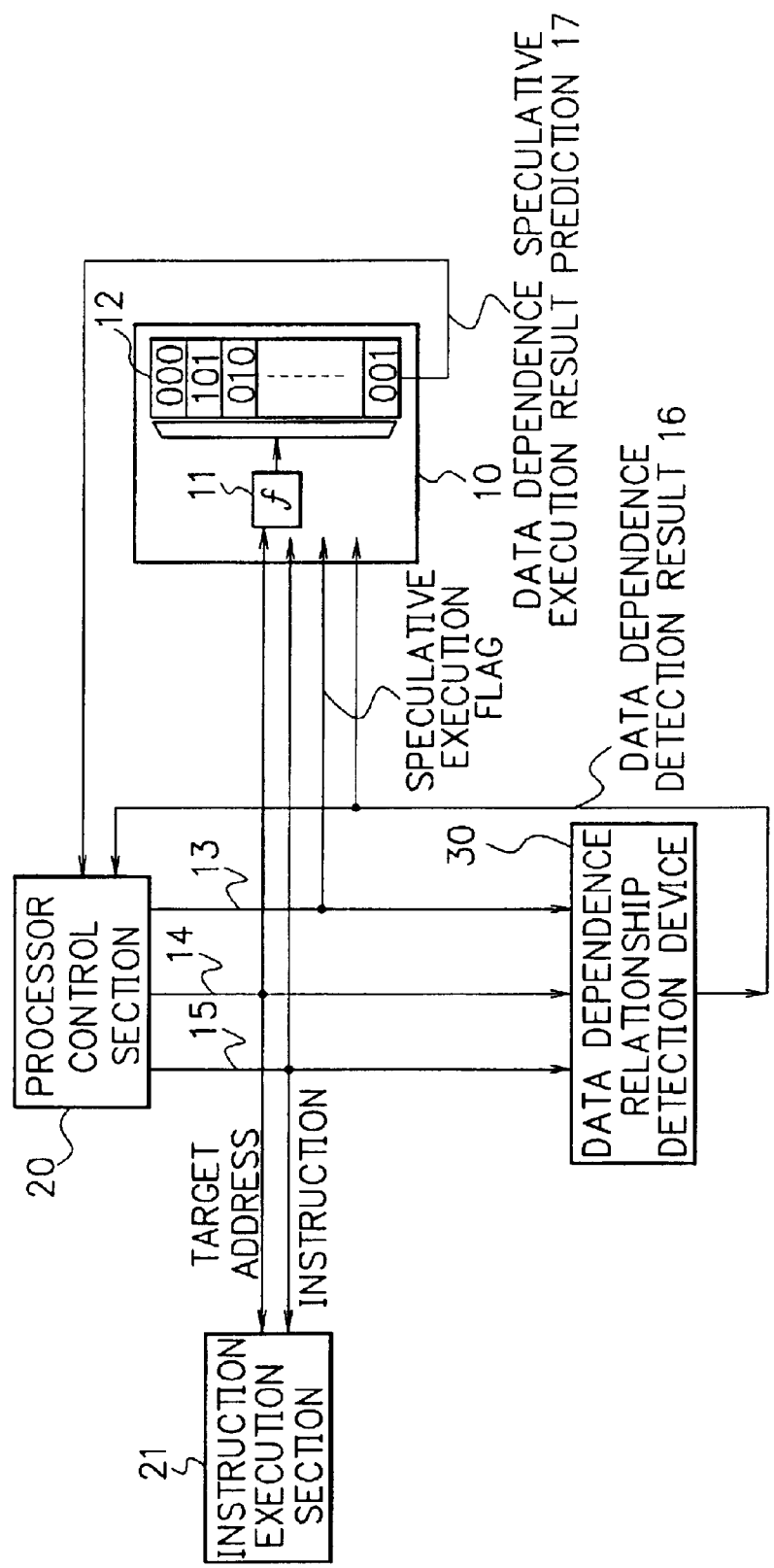
FIG. 3 is a block diagram showing the composition of a processor including a data dependence speculation control device in accordance with a first embodiment of the present invention.

FIG. 3 is a block diagram showing the composition of a processor including a data dependence speculation control device in accordance with a first embodiment of the present invention. The processor of FIG. 3 includes a data dependence speculation control device 10, a processor control section 20, an instruction execution section 21 and a data dependence relationship detection device 30. The other components of the processor is not shown in FIG. 3 for the sake of simplicity.

When an instruction is executed by the processor of FIG. 3, the instruction execution section 21, the data dependence speculation control device 10 and the data dependence relationship detection device 30 receive information on the instruction (instruction 15) from the processor control section 20 and thereby recognize the type of the instruction to be executed. If the instruction to be executed is a memory operation instruction, the processor control section 20 informs the instruction execution section 21, the data dependence speculation control device 10 and the data dependence relationship detection device 30 about the target address 14 of the instruction.

Further, when a memory operation instruction is executed by means of the data dependence speculative execution, the processor control section 20 informs the data dependence speculation control device 10 and the data dependence relationship detection device 30 about the fact by use of a speculative execution flag 13.

The data dependence speculation control device 10 includes a hash function circuit 11 and a speculative execution (success/failure) result history table 12. The data dependence speculation control device 10 receives the speculative execution flag 13, the target address 14 and the instruction 15 from the processor control section 20, and outputs a data dependence speculative execution result prediction 17 to the processor control section 20.

The hash function circuit 11 is a logic circuit that implements a hash function f for converting an m-bit target address of a memory operation instruction into an n-bit entry number of the speculative execution result history table 12. The number n is generally smaller than m (m>n). The hash function f has the property of outputting the same value for the same inputs, that is, if we assume N1=f(A1) and N2=f(A2), N1=N2 holds if A1=A2. Therefore, the hash function f guarantees the same entry number (of the speculative execution result history table 12) for the same target addresses (of load/store instructions).

On the other hand, N1≠N2 does not necessarily hold even if A1≠A2. In other words, there are cases where the hash function f outputs the same entry numbers (of the speculative execution result history table 12) for different target addresses (of load/store instructions).

The speculative execution result history table 12 is composed of a plurality of entries which are implemented by memory elements, flip-flops or the like. Each entry stores the history of success/failure result of the speculative execution of the past, with regard to one or more target addresses of memory operation instructions. The number of entries included in the speculative execution result history table 12 is equal to $2^n$ when the hash function circuit 11 has n-bit output. The speculative execution result history table 12 conducts read/write to an entry that is designated by an entry number outputted by the hash function circuit 11.

Figure 4:
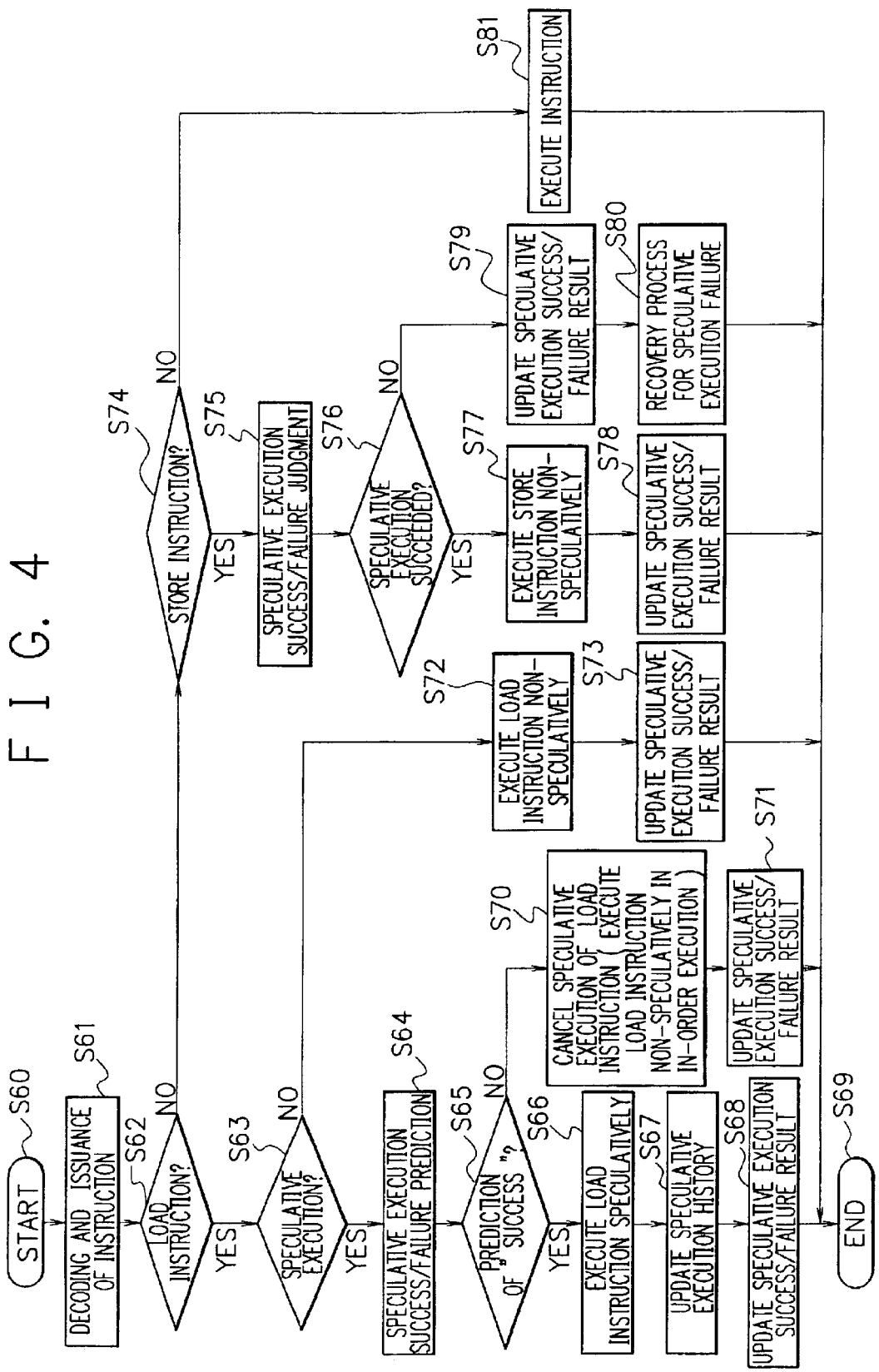
FIG. 4 is a flow chart showing an instruction execution process which is executed by the processor of FIG. 3.

FIG. 4 is a flow chart showing an instruction execution process which is executed by the processor of FIG. 3. The processor of FIG. 3 has a speculative execution success/failure judgment function (by the data dependence relationship detection device 30, a speculative execution success/failure prediction function (by the data dependence speculation control device 10) and a speculative execution control function (by the data dependence speculation control device 10). The instruction execution is started in step S60 and ends in step S69 of FIG. 4.

First, decoding and issuing of an instruction is carried out by the processor control section 20 in step S61. In the next step S62, the process proceeds to step S63 if the issued instruction is a load instruction ("YES" in the step S62). If the issued instruction is a store instruction ("NO" in the step S62), the process proceeds to step S74. The processor control section 20 carries out the issuance of the instruction by outputting the instruction 15.

In the step S63, the process proceeds to step S64 if the issued instruction is going to be executed by means of the speculative execution ("YES" in the step S63). If the issued instruction is going to be executed by means of the non-speculative execution ("NO" in the step S63), the process proceeds to step S72. Whether the issued instruction is speculative or non-speculative is designated by the speculative execution flag 13 which is outputted by the processor control section 20.

In the case of the speculative execution of the load instruction ("YES" in the step S63), the data dependence speculation control device 10 predicts whether the speculative execution of the load instruction will succeed or fail (step S64).

If the prediction by the data dependence speculation control device 10 is "success" ("YES" in the step S65), the process proceeds to step S66. In this case, the speculative execution of the load instruction is carried out (step S66) and the fact (speculative execution of the load instruction) is recorded and stored in the data dependence relationship detection device 30 (step S67). In the next step S68, the speculative execution success/failure result which has been stored in the data dependence speculation control device 10 is updated by the fact (speculative execution of the load instruction), thereby the speculative execution of the load instruction is finished (step S69).

On the other hand, if the prediction in the step S65 is "failure" ("NO" in the step S65), the speculative execution of the load instruction is canceled (step S70). In this case, the load instruction is executed later in the in-order execution by means of the non-speculative execution. In the next step S71, the speculative execution success/failure result which has been stored in the data dependence speculation control device 10 is updated by the fact (cancellation of the speculative execution), thereby the process for the load instruction is finished with the cancellation (step S69).

In the case where the issued instruction is non-speculative ("NO" in the step S63), the load instruction is executed by means of the non-speculative execution (step S72). In the following step S73, the speculative execution success/failure result which has been stored in the data dependence speculation control device 10 is updated by the fact (non-speculative execution of the load instruction), thereby the execution of the load instruction is finished (step S69).

In the step S74, the process proceeds to step S75 if the issued instruction is a store instruction ("YES" in the step S74). If the issued instruction is neither a load instruction nor a store instruction ("NO" in the step S74), the process proceeds to step S81. Therefore, when a store instruction has been issued, the data dependence relationship detection device 30 judges whether the load instructions that have been executed so far by means of the speculative execution have succeeded or failed (step S75). If the speculative execution of the load instructions has succeeded ("YES" in the step S76), the process proceeds to step S77, otherwise (if the speculative execution has failed), the process proceeds to step S79.

In the case where the speculative execution so far has succeeded ("YES" in the step S76), the store instruction is executed (non-speculatively) (step S77). In the next step S78, due to the fact that the speculative execution has succeeded, the speculative execution success/failure result stored in the data dependence speculation control device 10 is updated, thereby the execution of the store instruction is finished (step S69).

On the other hand, in the case where the speculative execution so far has failed ("NO" in the step S76), the speculative execution success/failure result stored in the data dependence speculation control device 10 is updated by the fact (failure of the speculative execution) (step S79). In the following step S80, the recovery process for the speculative execution failure is carried out, thereby the process for the store instruction is finished (step S69).

In the case where the issued instruction is neither a load instruction nor a store instruction ("NO" in the step S74), the instruction is executed (step S81), and thereby the process for the issued instruction is finished (step S69). In this case, the data dependence speculation control device 10 and the data dependence relationship detection device 30 carries out no process.

In the following, the operation of the data dependence speculation control device 10 will be explained in detail referring again to FIGS. 3 and 4.

First, in the step S64 of the flow chart of FIG. 4, the data dependence speculation control device 10 refers to the speculative execution success/failure result history stored in the speculative execution result history table 12 and thereby predicts whether the speculative execution of the current load instruction will succeed or fail. Concretely, the target address 14 of the load instruction which is informed by the processor control section 20 is inputted to the hash function circuit 11. The hash function circuit 11 converts the target address 14 into an entry number of the speculative execution result history table 12 and inputs the entry number to the speculative execution result history table 12. The speculative execution result history table 12 outputs the contents of the entry designated by the inputted entry number, and the success/failure of the speculative execution of the load instruction is predicted based on the contents of the entry.

In the steps S68, S71, S73, S78 and S79 of the flow chart of FIG. 4, the speculative execution success/failure result history which is stored in the speculative execution result history table 12 is updated based on the flow. Concretely, the target address 14 of the load/store instruction which is informed by the processor control section 20 is converted by the hash function circuit 11 into an entry number of the speculative execution result history table 12 and the entry number is inputted to the speculative execution result history table 12. The speculative execution result history table 12 outputs the contents of the entry designated by the inputted entry number, and the contents of the entry is updated based on the current contents of the entry and the flow.

Figure 5:
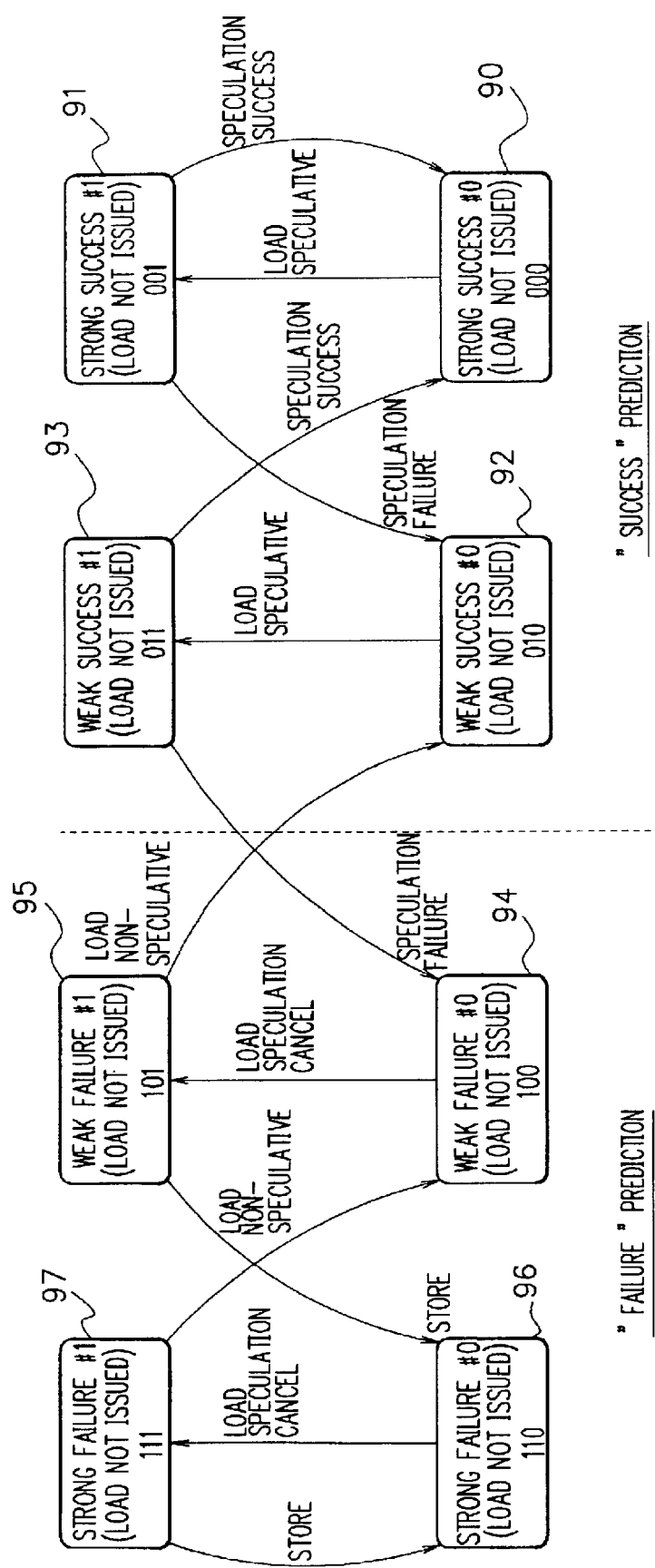
FIG. 5 is a state transition diagram showing the state transition of the contents of each entry of a speculative execution result history table of the data dependence speculation control device.

FIG. 5 is a state transition diagram showing the state transition of the contents of each entry of the speculative execution result history table 12. Each entry is composed of memory elements of 3 bits, by which one of eight states (speculative execution success/failure historical states): "strong success #0" (reference numeral 90); "strong success #1" (reference numeral 91); "weak success #0" (reference numeral 92); "weak success #1" (reference numeral 93); "weak failure #0" (reference numeral 94); "weak failure #1" (reference numeral 95); "strong failure #0" (reference numeral 96); and "strong failure #1" (reference numeral 97), is designated.

The "strong success #0" 90 indicates a state in which the success rate of the speculative execution so far with regard to the entry is very high and there has been no speculative issuance of a load instruction having the target address assigned to the entry. The "strong success #1" 91 indicates a state in which the success rate of the speculative execution so far with regard to the entry is very high and there has been speculative issuance of a load instruction having the target address assigned to the entry.

The "weak success #0" 92 indicates a state in which the success rate of the speculative execution so far with regard to the entry is high but not as high as the "strong success #0" 90 and there has been no speculative issuance of a load instruction having the target address assigned to the entry. The "weak success #1" 93 indicates a state in which the success rate of the speculative execution so far with regard to the entry is high but not as high as the "strong success #1" 91 and there has been speculative issuance of a load instruction having the target address assigned to the entry.

The "strong failure #0" 96 indicates a state in which the success rate of the speculative execution so far with regard to the entry is very low and there has been no speculative issuance of a load instruction having the target address assigned to the entry. The "strong failure #1" 97 indicates a state in which the success rate of the speculative execution so far with regard to the entry is very low and there has been speculative issuance of a load instruction having the target address assigned to the entry.

The "weak failure #0" 94 indicates a state in which the success rate of the speculative execution so far with regard to the entry is low but not as low as the "strong failure #0" 96 and there has been no speculative issuance of a load instruction having the target address assigned to the entry. The "weak failure #1" 95 indicates a state in which the success rate of the speculative execution so far with regard to the entry is low but not as low as the "strong failure #1" 97 and there has been speculative issuance of a load instruction having the target address assigned to the entry.

The eight states which are held by each entry of the speculative execution result history table 12 can be implemented by memory elements of 3 bits. In the example of FIG. 5, the "strong success #0" 90, the "strong success #1" 91, the "weak success #0" 92, the "weak success #1" 93, the "weak failure #0" 94, the "weak failure #1" 95, the "strong failure #0" 96 and the "strong failure #1" 97 are expressed by 3-bit codes "000", "001", "010", "011", "100", "101", "110" and "111", respectively.

The speculative execution success/failure prediction of the step S64 of the flow chart of FIG. 4 is carried out based on a 3-bit code ("000", "001", "010", "011", "100", "101", "110" or "111") that is held by the referred entry. If the referred entry holds a 3-bit code corresponding to the "strong success #0", the "strong success #1", the "weak success #0" or the "weak success #1", the probability of success of the current speculative execution is judged to be high and thereby the load instruction is executed speculatively.

If the referred entry holds a 3-bit code corresponding to the "weak failure #0", the "weak failure #1", the "strong failure #0" or the "strong failure #1", the probability of success of the current speculative execution is judged to be low (the probability of failure is high), thereby the speculative execution of the load instruction is canceled. The load instruction is executed later in the in-order execution by means of the non-speculative execution.

State transitions among the eight states take place in the steps S68, S71, S73, S78 and S79 as will be explained below. In the initial state, each entry stays in an arbitrary state.

When an entry is staying in the "weak success #0" 92, if a speculative load instruction having the target address corresponding to the entry is issued, the entry is changed from the "weak success #0" 92 to the "weak success #1" 93 in the step S68. In this case, the speculative execution of the load instruction is expected (in the speculative execution success/failure prediction of the step S64) to succeed, therefore, the load instruction is actually executed by means of the speculative execution (step S66). The other steps (steps S71, S73, S78 and S79) cause no state transition to the entry staying in the "weak success #0" 92.

When an entry is staying in the "weak success #1" 93, if a store instruction having the target address corresponding to the entry is executed and thereafter no load instruction speculative execution failure is detected in the step S75, due to the success of the load instruction speculative execution, the entry is changed from the "weak success #1" 93 to the "strong success #0" 90 in the step S78.

On the other hand, if a load instruction speculative execution failure is detected in the step S75, due to the failure of the load instruction speculative execution, the entry is changed from the "weak success #1" 93 to the "weak failure #0" 94 in the step S79. The other steps (steps S68, S71 and S73) cause no state transition to the entry staying in the "weak success #1" 93.

When an entry is staying in the "strong success #0" 90, if a speculative load instruction having the target address corresponding to the entry is issued, the entry is changed from the "strong success #0" 90 to the "strong success #1" 91 in the step S68. In this case, the speculative execution of the load instruction is expected (in the speculative execution success/failure prediction of the step S64) to succeed, therefore, the load instruction is actually executed by means of the speculative execution (step S66). The other steps (steps S71, S73, S78 and S79) cause no state transition to the entry staying in the "strong success #0" 90.

When an entry is staying in the "strong success #1" 91, if a store instruction having the target address corresponding to the entry is executed and thereafter no load instruction speculative execution failure is detected in the step S75, due to the success of the load instruction speculative execution, the entry is changed from the "strong success #1" 91 to the "strong success #0" 90 in the step S78.

On the other hand, if a load instruction speculative execution failure is detected in the step S75, due to the failure of the load instruction speculative execution, the entry is changed from the "strong success #1" 91 to the "weak success #0" 92 in the step S79. The other steps (steps S68, S71 and S73) cause no state transition to the entry staying in the "strong success #1" 91.

When an entry is staying in the "weak failure #0" 94, if a speculative load instruction having the target address corresponding to the entry is issued, the entry is changed from the "weak failure #0" 94 to the "weak failure #1" 95 in the step S71. In this case, the speculative execution of the load instruction is expected (in the speculative execution success/failure prediction of the step S64) to fail, therefore, the load instruction is not actually executed by means of the speculative execution. The other steps (steps S68, S73, S78 and S79) cause no state transition to the entry staying in the "weak failure #0" 94.

When an entry is staying in the "weak failure #1" 95, if a store instruction having the target address corresponding to the entry is executed, the probability of success of the speculative execution of a load instruction related to the entry is regarded to be low, and thus the entry is changed from the "weak failure #1" 95 to the "strong failure #0" 96 in the step S78 or S79. In this case, the success probability of the load instruction speculative execution is regarded to be low since the entry changed from the "weak failure #0" 94 to the "weak failure #1" 95 due to the issuance of a speculative load instruction and thereafter the store instruction having the same target address was issued.

Actually, the speculative execution of the load instruction is expected (in the speculative execution success/failure prediction of the step S64) to fail, therefore, the speculative execution of the load instruction is canceled and the load instruction is executed later by means of the non-speculative execution. Even if the load instruction were executed speculatively, the speculative execution would have failed.

Meanwhile, when an entry is staying in the "weak failure #1" 95, if a non-speculative load instruction having the target address corresponding to the entry is issued, the probability of success of the speculative execution of a load instruction related to the entry is regarded to be high, and thus the entry is changed from the "weak failure #1" 95 to the "weak success #0" 92 in the step S71. In this case, the success probability of the load instruction speculative execution is regarded to be high since the entry changed from the "weak failure #0" 94 to the "weak failure #1" 95 due to the issuance of a speculative load instruction and thereafter the non-speculative load instruction was issued after no issuance of a store instruction having the same target address.

The non-speculative load instruction is regarded to be a load instruction that has been executed non-speculatively due to a speculative execution failure prediction, and no store instruction having the same target address has been issued between the issuance of the two load instructions. Therefore, if the load instruction were executed speculatively, the speculative execution would have succeeded. The other steps (steps S68 and S73) cause no state transition to the entry staying in the "weak failure #1" 95.

When an entry is staying in the "strong failure #0" 96, if a speculative load instruction having the target address corresponding to the entry is issued, the entry is changed from the "strong failure #0" 96 to the "strong failure #1" 97 in the step S71. In this case, the speculative execution of the load instruction is expected (in the speculative execution success/failure prediction of the step S64) to fail, therefore, the load instruction is not actually executed by means of the speculative execution. The other steps (steps S68, S73, S78 and S79) cause no state transition to the entry staying in the "strong failure #0" 96.

When an entry is staying in the "strong failure #1" 97, if a store instruction having the target address corresponding to the entry is executed, the probability of success of the speculative execution of a load instruction related to the entry is regarded to be low, and thus the entry is changed from the "strong failure #1" 97 to the "strong failure #0" 96 in the step S78 or S79. In this case, the success probability of the load instruction speculative execution is regarded to be low since the entry changed from the "strong failure #0"

96 to the "strong failure #1" 97 due to the issuance of a speculative load instruction and thereafter the store instruction having the same target address was issued.

Actually, the speculative execution of the load instruction is expected (in the speculative execution success/failure prediction of the step S64) to fail, therefore, the speculative execution of the load instruction is canceled and the load instruction is executed later by means of the non-speculative execution. Even if the load instruction were executed speculatively, the speculative execution would have failed.

Meanwhile when an entry is staying in the "strong failure #1" 97, if a non-speculative load instruction having the target address corresponding to the entry is issued, the probability of success of the speculative execution of a load instruction relating the entry is regarded to be high, and thus the entry is changed from the "strong failure #1" 97 to the "weak failure #0" 94 in the step S71. In this case, the success probability of the load instruction speculative execution is regarded to be high since the entry changed from the "strong failure #0" 96 to the "strong failure #1" 97 due to the issuance of a speculative load instruction and thereafter the non-speculative load instruction was issued after no issuance of a store instruction having the same target address.

The non-speculative load instruction is regarded to be a load instruction that has been executed in the non-speculative execution due to a speculative execution failure prediction, and no store instruction having the same target address has been issued between the issuance of the two load instructions. Therefore, if the load instruction were executed speculatively, the speculative execution would have succeeded. The other steps (steps S68 and S73) cause no state transition to the entry staying in the "strong failure #1" 97.

As explained above, when the success probability of the speculative execution relating to an entry of the speculative execution result history table 12 is high, the state of the entry changes as "strong failure"→"weak failure"→"weak success"→"strong success". On the other hand, when the success probability of the speculative execution relating to an entry is low, the state of the entry changes as "strong success"→"weak success"→"weak failure"→"strong failure".

In the speculative execution success/failure prediction of the step S64, when the entry stays in the "weak success" or the "strong success", the speculative execution is expected to succeed and thereby the load instruction is executed by means of the speculative execution. When the entry stays in the "strong failure" or the "weak failure", the speculative execution is expected to fail, thereby the speculative execution of the load instruction is cancelled and the load instruction is executed later in the program order by means of the non-speculative execution. By the data dependence speculation control device 10 of the first embodiment, the load instruction speculative execution whose success probability is low is cancelled and the load instruction is executed later by means of the non-speculative execution, thereby the failure rate of the speculative execution is reduced and thereby the program execution performance is improved.

Generally, the number of entries of the speculative execution result history table 12 is far smaller than the total address space to be handled by the memory operation instructions, therefore, the hash function circuit 11 sometimes assigns the same entry number (of the speculative execution result history table 12) to a plurality of memory operation instructions having different target addresses. In other words, there are cases where the speculative execution success/failure prediction (step S64) is executed for memory operation instructions having different target addresses by use of the same entry of the speculative execution result history table 12. Such assignment of memory operation instructions having different target addresses to the same entry of the speculative execution result history table 12 will hereafter be called "the occurrence of an alias".

When such an alias occurred, the storage of the speculative execution success/failure history is not necessarily done properly and correctly, thereby the accuracy of the speculative execution success/failure prediction (hitting ratio of the prediction) might deteriorate. However, even so, the correctness of the program execution result is ensured. Even through no problem occurs to the meaning of the program, the improvement of the program execution performance by use of the speculative execution is impaired due to the deterioration of the predictive accuracy.

From the above viewpoints, it is desirable that the occurrence of the alias be avoided. The occurrence of the alias can be reduced by properly selecting the hash function of the hash function circuit 11 or by preparing a sufficient number of entries in the speculative execution result history table 12.

On the other hand, by allowing the occurrence of aliases, the number of load instructions to which the speculative execution success/failure prediction can be carried out can be increased without the limitation by the number of the entries of the speculative execution result history table 12. Therefore, in many cases, the speculative execution success/failure prediction according to the first embodiment (allowing aliases) can contribute more effectively to the improvement of the program execution performance by means of the speculative execution, in comparison with the way prohibiting the occurrence of the alias and limiting the number of load instructions to which the speculative execution success/failure prediction can be carried out.

Figure 6A:
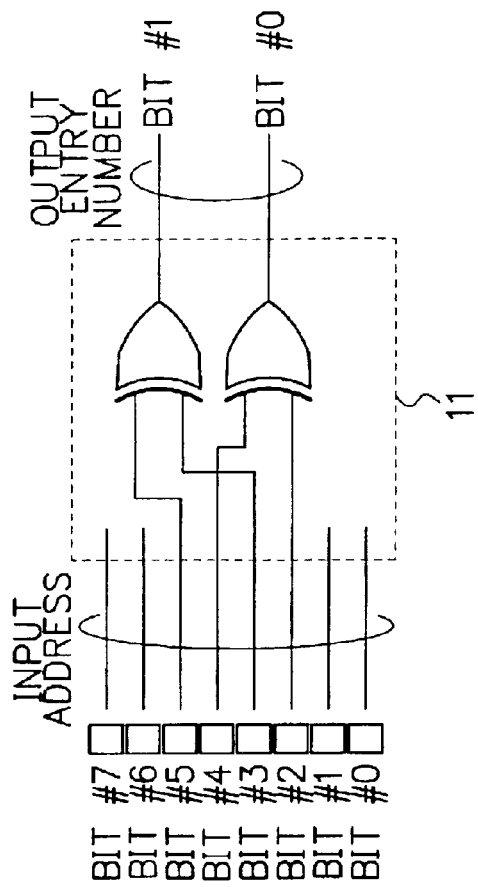
FIGS. 6A and 6B are circuit diagrams showing examples of a hash function circuit that can be employed in the data dependence speculation control device.
Figure 6B:
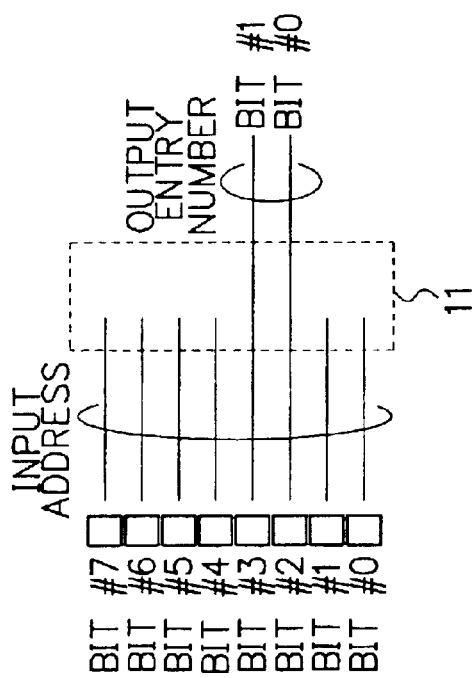

In the following, a concrete example of the operation of the data dependence speculation control device 10 of the first embodiment will be described. In this example, the speculative execution result history table 12 is composed of four entries, namely, entries #0, #1, #2 and #3. If we assume that the target addresses can be expressed by use of 8 bits, the hash function circuit 11 can be implemented by, for example, letting particular two bits of the inputted target address be outputted as shown in FIG. 6A. It is also possible to let the hash function circuit 11 employ two XOR circuits each of which outputs XOR of particular two bits of the inputted target address, as shown in FIG. 6B.

Figures 7A, 7B:
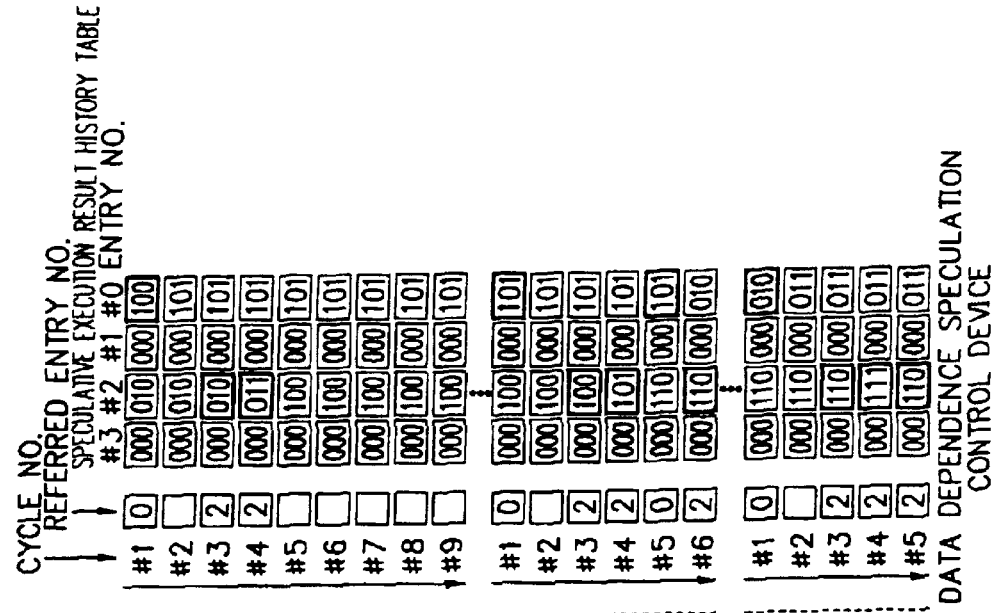
FIG. 7A through FIG. 7C are schematic diagrams for explaining a concrete example of the operation of the data dependence speculation control device.
Figure 7C:
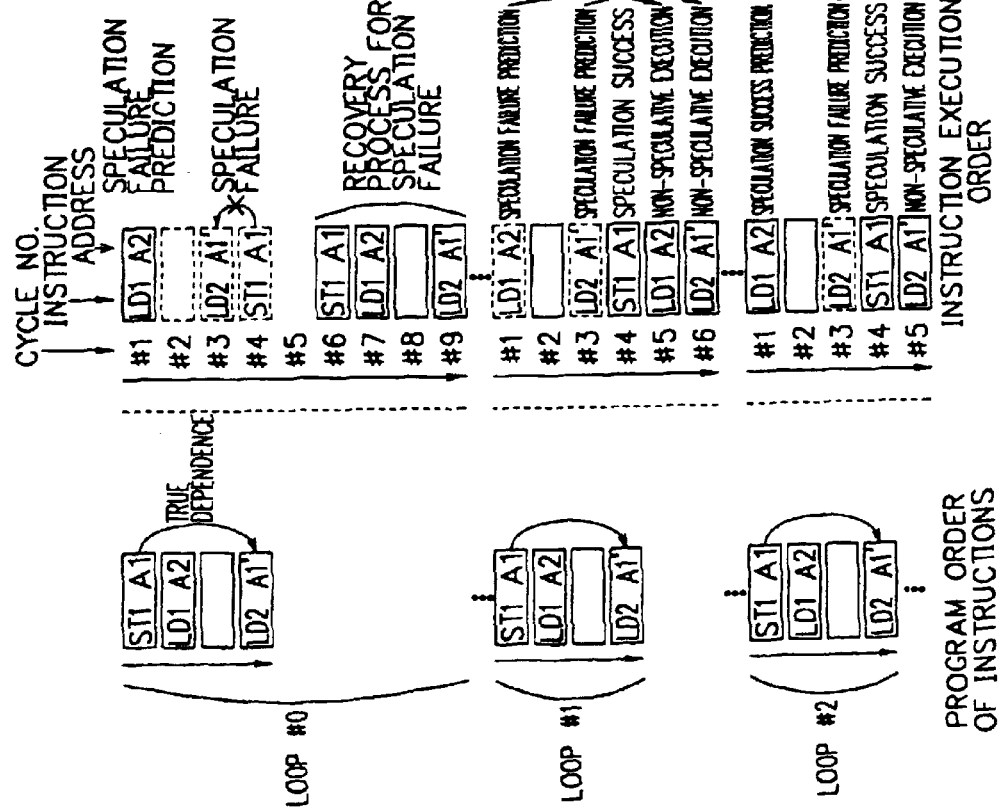

FIG. 7A through FIG. 7C are schematic diagrams for explaining a concrete example of the operation of the data dependence speculation control device 10 of the first embodiment. FIG. 7A shows the program order of instructions that are included in a program as an example. The program order shown in FIG. 7A is a typical one that can be seen in a program having loop structure, in which an instruction sequence, which is composed of a store instruction ST1, a load instruction LD1, an instruction that is not a load/store instruction (hereafter, referred to as a "non-load/store instruction") and a load instruction LD2, is repeatedly executed. In FIG. 7A, instructions of only three consecutive loops #0, #1 and #2 are shown for the sake of simplicity.

The target addresses of the store instruction ST1, the load instruction LD1 and the load instruction LD2 are A1, A2 and A1', respectively. If we assume that A1=A1', there is a true dependence relationship of the store instruction ST1 on the load instruction LD2 since the store instruction ST1 is prior to the load instruction LD2 in the program order. Therefore, the correctness of the program execution result is not guaranteed unless the store instruction ST1 is executed prior to the load instruction LD2, that is, unless data which has been written in the address A1 (=A1') by the store instruction ST1 is read out from the address A1' (=A1) by the load instruction LD2.

When the processor is in the data dependence speculative execution state, the instructions are executed speculatively (out-of-order execution from an instruction that is executable) even if the presence/absence of the true dependence relationship of a store instruction on a load instruction is not clear yet. FIG. 7B shows an example of the out-of-order execution of the program of FIG. 7A which is carried out in the data dependence speculative execution state. Starting from the left, each row of FIG. 7B includes a cycle number, an instruction to be executed in the cycle, and the target address of the executed instruction. It is assumed that the target address A1 of the store instruction ST1 will not become clear until the cycle #4. The target addresses A2 and A1' of the load instructions LD1 and LD2 are assumed to become clear in the cycle #1.

FIG. 7C shows the operation of the speculative execution result history table 12 for the out-of-order execution of FIG. 7B. Starting from the left, each row of FIG. 7C includes a cycle number, an entry number (of the speculative execution result history table 12) that is referred to by a memory operation instruction that is executed in the cycle, and the state of the speculative execution result history table 12 in the cycle. The state of the speculative execution result history table 12 includes the contents of the entry #0, the entry #1, the entry #2 and the entry #3, starting from the right.

For example, in the cycle #1 of the loop #0, the contents of the entry #0 is "100" (weak failure #0), the contents of the entry #1 is "000" (strong success #0), the contents of the entry #2 is "010" (weak success #0), and the contents of the entry #3 is "000" (strong success #0).

In the cycle #1 of the loop #0, the store instruction ST1 should be issued according to the program order, however, its target address A1 is unknown yet. Therefore, the next load instruction LD1 whose target address A2 is already known becomes the candidate of the out-of-order execution by means of the speculative execution. Prior to the speculative execution, the data dependence speculation control device 10 carries out the speculative execution success/failure prediction (step S64 of FIG. 4). Concretely, the target address A2 of the load instruction LD1 is inputted to the hash function circuit 11 and thereby the target address A2 is converted into an entry number of the speculative execution result history table 12. If we assume that the hash function circuit 11 outputted an entry number "0" (#0), the speculative execution success/failure historical state "100" (weak failure #0) which has been stored in the entry #0 is read out from of the speculative execution result history table 12.

By the state "100" (weak failure #0), the speculative execution of is expected to fail, therefore, the speculative execution of the load instruction LD1 is canceled and the load instruction LD1 is executed later in the in-order execution by means of the non-speculative execution (step S70 of FIG. 4). In this case, the entry #0 of the speculative execution result history table 12 is changed from "100" (weak failure #0) to "101" (weak failure #1) (step S71 of FIG. 4).

In the cycle #2 of the loop #0, the store instruction ST1 is still not executable, therefore, the non-load/store instruction (instruction that is not a memory operation instruction) next to the load instruction LD1 is executed. For this, the data dependence speculation control device 10 carries out no process.

In the cycle #3 of the loop #0, the store instruction ST1 is still not executable, therefore, the load instruction LD2 whose target address A1' is already known becomes the candidate of the out-of-order execution by means of the speculative execution. Prior to the speculative execution, the data dependence speculation control device 10 carries out the speculative execution success/failure prediction (step S64 of FIG. 4). Concretely, the target address A1' of the load instruction LD2 is inputted to the hash function circuit 11 and thereby the target address A1' is converted into an entry number of the speculative execution result history table 12. If we assume that the hash function circuit 11 outputted an entry number "2" (#2), the speculative execution success/failure historical state "010" (weak success #0) which has been stored in the entry #2 is read out from the speculative execution result history table 12.

By the state "010" (weak success #0), the speculative execution of is expected to succeed, therefore, the speculative execution of the load instruction LD2 is carried out (step S66 of FIG. 4). In this case, the entry #2 of the speculative execution result history table 12 is changed from "010" (weak success #0) to "011" (weak success #1) (step S68 of FIG. 4).

In the cycle #4 of the loop #0, the target address A1 of the store instruction ST1 becomes clear, therefore, the store instruction ST1 is executed. At this time, the data dependence relationship detection device 30 judges the success/failure of the load instruction speculative execution which has been carried out so far with regard to the data dependence relationships (step S75 of FIG. 4). In this case, the store instruction ST1 was executed prior to the load instruction LD2 regardless of the presence of the true dependence relationship of the store instruction ST1 on the load instruction LD2, therefore, the speculative execution of the load instruction LD2 is regarded to have failed.

In other words, the correctness of the program execution result is not guaranteed since the data that is read out from the target address A1' (=A1) by the load instruction LD2 is not the data that has been written into the address A1 (=A1') by the store instruction ST1 but data before the writing by the store instruction ST1. The data dependence relationship detection device 30 has the function for detecting the failure of the data dependence speculative execution and informing the processor control section 20 of the failure.

Due to the information from the data dependence relationship detection device 30, the processor control section 20 carries out the recovery process for the speculative execution failure (such as re-execution of the instructions that have been executed by means of the data dependence speculative execution) so that the correct program execution result can be obtained. Concretely, the results of the load instruction LD1, the non-load/store instruction, the load instruction LD2 and the store instruction ST1 which have been executed in the cycles #1–#4 are canceled and thereafter (from the cycle #6) the canceled instructions are re-executed in the in-order execution by means of the non-speculative execution. Therefore the store instruction ST1, the load instruction LD1, the non-load/store instruction and the load instruction LD2 are re-executed in the cycles #6, #7, #8 and #9 respectively by means of the non-speculative execution.

Meanwhile, the data dependence speculation control device 10 changes the entry #2 from "011" (weak success #1) to "100" (weak failure #0) since the speculative execution failure with regard to the store instruction ST1 was detected in the cycle #4 (step S79 of FIG. 4). In the cycles #6 through #9 in which the instructions are executed non-speculatively, no process is carried out by the data dependence speculation control device 10 and no reference nor alteration is made to the speculative execution result history table 12.

The operation of the data dependence speculation control device 10 and the instruction execution in the loop #0 are as explained above. While the speculative execution success/failure prediction for the load instruction LD2 was "success", the speculative execution failed in reality and the recovery process for the speculative execution failure became necessary. Due to the failure, the execution of the store instruction ST1, the load instruction LD1, the non-load/store instruction and the load instruction LD2 needed as long as nine cycles in the loop #0.

Next, the operation in the next loop #1 will be explained. Similarly to the loop #0, it is assumed that the target address A1 of the store instruction ST1 will not become clear until the cycle #4 of the loop #1. The target addresses A2 and A1' of the load instructions LD1 and LD2 are assumed to become clear in the cycle #1.

In the cycle #1 of the loop #1, the store instruction ST1 should be issued according to the program order, however, its target address A1 has not become clear yet. Therefore, the next load instruction LD1 whose target address A2 is already known becomes the candidate of the out-of-order execution by means of the speculative execution. Prior to the speculative execution, the data dependence speculation control device 10 carries out the speculative execution success/failure prediction (step S64 of FIG. 4). From the entry #0 of the speculative execution result history table 12, "101" (weak failure #1) is read out, therefore, the speculative execution is expected to fail.

Therefore, the speculative execution of the load instruction LD1 is canceled and the load instruction LD1 is executed later in the in-order execution by means of the non-speculative execution (step S70 of FIG. 4). In this case, no state transition occurs to the entry #0 of the speculative execution result history table 12 (step S71 of FIG. 4).

In the cycle #2 of the loop #1, the store instruction ST1 is still not executable, therefore, the non-load/store instruction next to the load instruction LD1 is executed. For this, the data dependence speculation control device 10 carries out no process.

In the cycle #3 of the loop #1, the store instruction ST1 is still not executable, therefore, the load instruction LD2 whose target address A1' is already known becomes the candidate of the out-of-order execution by means of the speculative execution.

Prior to the speculative execution, the data dependence speculation control device 10 carries out the speculative execution success/failure prediction (step S64 of FIG. 4). From the entry #2 of the speculative execution result history table 12, "100" (weak failure #0) is read out, therefore, the speculative execution is expected to fail. Therefore, the speculative execution of the load instruction LD2 is canceled and the load instruction LD2 is executed later non-speculatively in the in-order execution (step S70 of FIG. 2). In this case, the entry #2of the speculative execution result history table 12 is changed from "100" (weak failure #0) to "101" (weak failure #1) (step S71 of FIG. 4).

In the cycle #4 of the loop #1, the target address A1 of the store instruction ST1 becomes clear, therefore, the store instruction ST1 is executed. At this time, the data dependence relationship detection device 30 judges the success/failure of the load instruction speculative execution which has been carried out so far with regard to the data dependence relationships (step S75 of FIG. 4). In this case, there exists a true dependence relationship of the store instruction ST1 on the load instruction LD2, however, the speculative execution of the load instruction LD2 has been canceled in the cycle #3 due to the prediction of failure. Therefore, there exists no load instruction whose speculative execution has failed with regard to the store instruction ST1, and thus the store instruction ST1 is executed non-speculatively (step S77 of FIG. 4). Since the store instruction ST1 has been executed, the entry #2of the speculative execution result history table 12 is changed from "101" (weak failure #1) to "110" (strong failure #0) (step S78 of FIG. 4).

In the cycle #5 of the loop #1, the load instruction LD1, whose speculative execution has been canceled in the cycle #1, is executed non-speculatively in the in-order execution with regard to the store instruction ST1. In this case, the entry #0 of the speculative execution result history table 12 is changed from "101" (weak failure #1) to "010" (weak success #0) (step S73 of FIG. 4).

In the cycle #6 of the loop #1, the load instruction LD2, whose speculative execution has been canceled in the cycle #3, is executed non-speculatively in the in-order execution with regard to the store instruction ST1. In this case, the entry #2 of the speculative execution result history table 12 remains in "110" (strong failure #0) (step S73 of FIG. 4).

The operation of the data dependence speculation control device 10 and the instruction execution in the loop #1 are as explained above. Differently from the loop #0, the speculative execution success/failure prediction for the load instruction LD2 (failure) was done correctly and thereby the speculative execution failure of the load instruction LD2 was avoided. Due to the avoidance of failure, the execution of the store instruction ST1, the load instruction LD1, the non-load/store instruction and the load instruction LD2 in the loop #1 was completed in only six cycles.

Next, the operation in the next loop #2 will be explained. Similarly to the loops #0 and #1, it is assumed that the target address A1 of the store instruction ST1 will not become clear until the cycle #4 of the loop #2. The target addresses A2 and A1' of the load instructions LD1 and LD2 are assumed to become clear in the cycle #1.

In the cycle #1 of the loop #2, the store instruction ST1 should be issued according to the program order, however, its target address A1 has not become clear yet. Therefore, the next load instruction LD1 whose target address A2 is already known becomes the candidate of the out-of-order execution by means of the speculative execution. Prior to the speculative execution, the data dependence speculation control device 10 carries out the speculative execution success/failure prediction (step S64 of FIG. 4). From the entry #0 of the speculative execution result history table 12, "010" (weak success #0) is read out, therefore, the speculative execution is expected to succeed.

Therefore, the load instruction LD1 is executed by means of the speculative execution (step S66 of FIG. 4). In this case, the entry #0 of the speculative execution result history table 12 is changed from "010" (weak success #0) to "011" (weak success #1) (step S68 of FIG. 4).

In the cycle #2 of the loop #2, the store instruction ST1 is still not executable, therefore, the non-load/store instruction next to the load instruction LD1 is executed. For this, the data dependence speculation control device 10 carries out no process.

In the cycle #3 of the loop #2, the store instruction ST1 is still not executable, therefore, the load instruction LD2 whose target address A1' is already known becomes the candidate of the out-of-order execution by means of the speculative execution. Prior to the speculative execution, the data dependence speculation control device 10 carries out the speculative execution success/failure prediction (step S64 of FIG. 4). From the entry #2 of the speculative execution result history table 12, "110" (strong failure #0) is read out, therefore, the speculative execution is expected to fail. Therefore, the speculative execution of the load instruction LD2 is canceled and the load instruction LD2 is executed later non-speculatively in the in-order execution (step S70 of FIG. 4). In this case, the entry #2 of the speculative execution result history table 12 is changed from "110" (strong failure #0) to "111" (strong failure #1) (step S71 of FIG. 4).

In the cycle #4 of the loop #2, the target address A1 of the store instruction ST1 becomes clear, therefore, the store instruction ST1 is executed. At this time, the data dependence relationship detection device 30 judges the success/failure of the load instruction speculative execution which has been carried out so far with regard to the data dependence relationships (step S75 of FIG. 4). In this case, there exists a true dependence relationship of the store instruction ST1 on the load instruction LD2, however, the speculative execution of the load instruction LD2 has been canceled in the cycle #3 due to the prediction of failure. Therefore, there exists no load instruction whose speculative execution has failed with regard to the store instruction ST1, and thus the store instruction ST1 is executed non-speculatively (step S77 of FIG. 4). Since the store instruction ST1 has been executed, the entry #2of the speculative execution result history table 12 is changed from "111" (strong failure #1) to "110" (strong failure #0) (step S78 of FIG. 4).

In the cycle #5 of the loop #2, the load instruction LD2, whose speculative execution has been canceled in the cycle #3, is executed non-speculatively in the in-order execution with regard to the store instruction ST1. In this case, the entry #2 of the speculative execution result history table 12 remains in "110" (strong failure #0) (step S73 of FIG. 4).

The operation of the data dependence speculation control device 10 and the instruction execution in the loop #2 are as explained above. Similarly to the loop #1, the speculative execution success/failure prediction for the load instruction LD2 (failure) was done correctly and thereby the speculative execution failure of the load instruction LD2 was avoided. Further, differently from the loop #1, the speculative execution success/failure prediction for the load instruction LD1 (success) was done correctly, thereby the load instruction LD1 was executed speculatively and the speculative execution succeeded. Therefore, the execution of the store instruction ST1, the load instruction LD1, the non-load/store instruction and the load instruction LD2 in the loop #2 was completed in as short as five cycles, which is the minimum possible number of cycles in this example.

As explained above, by the data dependence speculation control device 10 of the first embodiment, the speculative execution of a load instruction whose speculative execution is expected to fail is canceled, and the load instruction is executed later by means of the non-speculative execution, thereby the failure rate of the speculative execution is reduced and thereby the program execution performance can be improved.

The data dependence speculation control device 10 refers to the speculative execution success/failure result history of the past and thereby predicts the success/failure of the speculative execution of a current load instruction. When the data dependence speculation control device 10 predicted success, the load instruction is executed speculatively. When failure is predicted, the speculative execution is canceled and the load instruction is executed later non-speculatively in the in-order execution. Therefore, by the data dependence speculation control device 10, load instructions whose speculative execution success probability is low are executed by means of the non-speculative execution, thereby the speculative execution failure rate can be reduced and thereby the program execution performance can be improved. In the above concrete example, the number of cycles necessary for the execution of the four instructions was reduced from 9 to 5 during the repetition of the loops #0–#2.

Further, the data dependence speculation control device 10 of the first embodiment is characterized by the acceptance of the existence of the "alias". By allowing the aliases with regard to the target addresses of load/store instructions for the implementation of the speculative execution success/failure prediction, the need for storing all the target addresses for the success/failure prediction is eliminated, thereby the limitation on the number of load instructions (to which the speculative execution success/failure prediction can be carried out) is eliminated and the improvement of the program execution performance by use of the data dependence speculative execution can be attained with a small amount of hardware.

In addition, there is no need of the comparison of the target addresses (which takes time) between load/store instructions for the speculative execution success/failure prediction, and the number of entries of the speculative execution result history table 12 that have to be referred to for the prediction is at most 1. Therefore, the speculative execution success/failure prediction can be executed in a very short processing time, thereby the operating frequency of the processor can be raised easily.

Embodiment 2

FIG. 8 is a block diagram showing the composition of a multiprocessor system including a data dependence speculation control device in accordance with a second embodiment of the present invention. The data dependence speculation control device 55 which is shown in FIG. 8 serves as means for controlling data dependence speculative execution that is carried out in "multithread parallel processing" which is executed by the multiprocessor system.

The "multithread parallel processing" is a technique for speeding up the program execution and increasing the program processing speed by segmenting a program or two or more programs into a plurality of sectional program units called "threads" and executing the threads in parallel by use of a plurality of processors etc.

The thread is a sectional unit of the program(s) and is an instruction sequence which is composed of a plurality of instructions, therefore, in many cases, order relation can be defined among the threads. For example, if we describe two threads included in a program as "T0" and "T1", there clearly exists the order relation between the threads T0 and T1 depending on the positions of the threads in the program. If the thread T0 is prior to T1 in the program, the thread T0 is supposed to be executed prior to T1 in the meaning of the program.

On the other hand, if the thread T1 is prior to T0 in the program, the thread T1 is supposed to be executed prior to T0 in the meaning of the program. However, if no dependence relationship exists among the instructions included in the threads T0 and T1, the meaning of the program does not change and a correct program execution result can be obtained even if the threads T0 and T1 are executed ignoring the order relation between the threads.

In the multithread parallel processing, the program execution speed is increased by executing the threads in parallel (not according to the order relation among the threads) utilizing the above property of threads, while guaranteeing the correctness of the program execution result. Therefore, the multithread parallel processing can be regarded as "outof-order execution in units of threads", in contrast with the out-of-order execution in units instructions which was employed in the first embodiment.

Also in the out-of-order execution in units of threads, the aforementioned elimination of the dependence relationship (in the case of the anti-dependence relationship or the output dependence relationship) and the preservation of the dependence relationship between instructions included in threads are necessary for obtaining a correct program execution result. However, similarly to the case of the out-of-order execution in units instructions, the threads have to be executed essentially in the in-order execution especially for the true dependence relationship with regard to memory, whereas the benefit of the improvement of the program execution performance by use of the out-of-order execution can not be gained enough if the threads are executed non-speculatively in the in-order execution.

Especially in the out-of-order execution in units of threads, the out-of-order execution is disturbed in units of threads (each of which includes a plurality of instructions), therefore, the problem is acute. In order to resolve the problem, the data dependence speculative execution can be an effective measure similarly to the case of the out-of-order execution in units instructions. Therefore, in this embodiment, "data dependence speculative execution in units of threads" is employed. In the data dependence speculative execution in units of threads, the out-of-order execution of a thread is carried out before the presence/absence of a true dependence relationship between instructions of the threads becomes clear, on the assumption that no true dependence relationship exists.

In order to realize the data dependence speculative execution in units of threads, a function for detecting a true dependence relationship of a store instruction of a prior thread on a load instruction of a posterior thread (with regard to all thread pairs having the order relation) becomes necessary. The data dependence relationship detection device 57 shown in FIG. 8 has the function for detecting the true dependence relationship between threads.

However, also in the data dependence speculative execution in units of threads, if the probability of failure of the data dependence speculative execution is high, the program execution performance is necessitated to deteriorate due to the recovery process for the data dependence speculative execution failure.

Therefore, for the data dependence speculative execution in units of threads, the data dependence speculation control device 55 of the second embodiment refers to the speculative execution success/failure result history concerning instructions of the past and thereby predicts whether the speculative execution of the current load instruction will succeed or fail. If the prediction is "success", the load instruction is executed by means of the speculative execution, and otherwise (if the prediction is "failure"), the load instruction is executed later in the program order by means of the non-speculative execution.

Therefore, by the data dependence speculation control device 55 of the second embodiment, in the multithread parallel processing which is executed by the multiprocessor system, the speculative execution of an instruction whose success probability is low is canceled and the instruction is executed later by means of the non-speculative execution, thereby the failure rate of the speculative execution is reduced and thereby the program execution performance is improved.

In the following, the composition of the multiprocessor system including the data dependence speculation control device in accordance with the second embodiment of the present invention will be explained referring to FIG. 8. The multiprocessor system shown in FIG. 8 includes four processors 50, 51, 52 and 53, a thread control section 54, and a data dependence speculation control device 55. Incidentally, the processors 50, 51, 52 and 53 have the same composition and thus only the composition of the processor 50 is shown in FIG. 8 for the sake of simplicity.

The thread control section 54 carries out the control of the multithread parallel processing and the data dependence speculative execution, such as assigning threads to the processors 50, 51, 52 and 53, informing the processors about the order relation among threads, giving instructions for the recovery process when the data dependence speculative execution in units of threads failed, etc. Each processor (50, 51, 52, 53) includes a data dependence relationship detection device 57, a processor control section 56 and an instruction execution section 21.

In the second embodiment, the speculative execution is executed in units of threads as mentioned above, however, it is assumed that no speculative execution in units of instructions is executed in each thread. Therefore, the data dependence relationship detection device 57 has a function for detecting the true dependence relationship between threads but does not have the function for detecting the true dependence relationship between instructions that are included in a thread. The data dependence speculation control device 55 is shared by the four processors 50, 51, 52 and 53 and controls the speculative execution in units of threads which is executed by the processors 50, 51, 52 and 53.

In order to execute the program by means of the multithread parallel processing by use of the processors 50, 51, 52 and 53, the thread control section 54 assigns each processor (50, 51, 52, 53) threads to be executed by the processor. The thread control section 54 also sends each processor a speculative execution flag 40 (indicating whether the thread execution is the data dependence speculative execution or not) and a thread order 41 (indicating the order relation between the thread executed by the processor and threads that are executed by the other processors). The speculative execution flags 40, which are outputted by the thread control section 54 to the processors 50, 51, 52 and 53, are also supplied to the data dependence speculation control device 55.

When a processor executes an instruction of the thread assigned by the thread control section 54, the processor control section 56 of the processor sends information on the instruction (instruction 45, including the type of the instruction to be executed) to the instruction execution section 21, the data dependence relationship detection device 57, the other processors and the data dependence speculation control device 55.

If the instruction to be executed is a memory operation instruction, the processor control section 56 informs the instruction execution section 21, the data dependence relationship detection device 57, the other processors and the data dependence speculation control device 55 about the target address 46 of the instruction.

Therefore, the data dependence relationship detection device 57 of each processor is informed of the types of instructions that are executed by the processor and the other processors by receiving the instructions 45. If the type of the instruction is a memory operation instruction, the data dependence relationship detection device 57 is informed of the target address 46 of the memory operation instruction.

Meanwhile, the data dependence speculation control device 55 is informed of the types of the instructions being executed by the processors 50, 51, 52 and 53 by receiving the instructions 45. If the type of the instruction is a memory operation instruction, the data dependence speculation control device 55 is informed of the target address 46 of the memory operation instruction.

For example, when the processor 50 executes an instruction of a thread that has been assigned by the thread control section 54, the processor control section 56 of the processor 50 sends the instruction 45 to the instruction execution section 21 and the data dependence relationship detection device 57 of the processor 50, the other processors 51, 52 and 53, and the data dependence speculation control device 55, and thereby informs them about the type of the instruction to be executed.

If the instruction to be executed is a memory operation instruction, the processor control section 56 of the processor 50 informs the instruction execution section 21 and the data dependence relationship detection device 57 of the processor 50, the other processors 51, 52 and 53, and the data dependence speculation control device 55 about the target address 46 of the instruction.

Meanwhile, the data dependence relationship detection device 57 of the processor 50 is informed of the types of the instructions being executed by the other processors 51, 52 and 53 by receiving the instructions 45.

If the type of the instruction is a memory operation instruction, the data dependence relationship detection device 57 of the processor 50 is informed of the target address 46 of the memory operation instruction.

The data dependence relationship detection device 57 of each processor has a function for detecting true dependence relationships based on the order relation among the threads that are executed by the processors 50, 51, 52 and 53. For example, the data dependence relationship detection device 57 of the processor 50 detects a true dependence relationship of a store instruction (included in a thread that is executed by one of the other processors 51, 52 and 53 and that is prior in the program order to the thread executed by the processor 50) on a load instruction (included in the thread executed by the processor 50).

FIG. 9 is a block diagram showing an example of the composition of the data dependence relationship detection device 57 which is shown in FIG. 8. In FIG. 9, out of the instructions 45 which are inputted to the data dependence relationship detection device 57, those supplied from the processor control section 56 of the processor including the data dependence relationship detection device 57 itself are expressed by a reference numeral "45A", and those supplied from the other processors are expressed by a reference numeral "45B". Similarly, out of the target addresses 46 which are inputted to the data dependence relationship detection device 57, those supplied from the processor control section 56 of the processor (including the data dependence relationship detection device 57 itself) are expressed by a reference numeral "46A", and those supplied from the other processors are expressed by a reference numeral "46B".

The data dependence relationship detection device 57 of FIG. 9 includes a plurality of address buffers 31 for storing target addresses of load instructions that have been executed by the processor, three address coincidence detection circuits 35, and a prior thread selection circuit 34. Each address coincidence detection circuit 35 includes a plurality of address comparators 32 (each of which is connected to each of the address buffers 31) and an OR circuit 33 (to which the outputs of all the address comparators 32 are inputted). The address coincidence detection circuit 35 compares the target addresses 46A (stored in the address buffers 31) of load instructions that have been executed by the processor with the target address 46B of a store instruction that is being executed by another processor.

The data dependence relationship detection device 57 is provided with three address coincidence detection circuits 35 in order to let the other three processors carry out address comparisons simultaneously. The prior thread selection circuit 34 refers to the outputs of the three address coincidence detection circuits 35, the instructions 45B from the other three processors, the speculative execution flag 40 from the thread control section 54, and the thread order 41 from the thread control section 54, thereby detects a true dependence relationship of a store instruction (included in a thread that is executed by one of the other processors and that is prior in the program order to the thread executed by the processor including the data dependence relationship detection device 57 itself) on a load instruction (included in the thread executed by the processor). The result of the true dependence relationship detection is outputted to the thread control section 54 as a data dependence relationship detection result 49.

The detection of a true dependence relationship of a store instruction (included in a prior thread executed by another processor) on a load instruction (included in the thread executed by the processor) (hereafter, referred to as "true dependence relationship between threads") is carried out by the data dependence relationship detection device 57 as follows. Incidentally, the following explanation will be given taking the data dependence relationship detection device 57 of the processor 50 as an example.

When each processor executes a thread non-speculatively in the program order with regard to the data dependence relationship between threads, the data dependence relationship detection device 57 of the processor carries out no process.

On the other hand, when each processor executes a thread by means of the speculative execution in units of threads, the data dependence relationship detection device 57 carries out the process for detecting the true dependence relationships between threads. Whether a processor is in the speculative execution state or in the non-speculative execution state concerning the thread execution is judged by the speculative execution flag 40 which is supplied from the thread control section 54 to the data dependence relationship detection device 57 of the processor. At least to a processor executing a thread at the head (in the program order) of the four threads executed by the four processors 50, 51, 52 and 53, a speculative execution flag 40 indicating the non-speculative execution state is supplied from the thread control section 54.

When the processor 50 (including the data dependence relationship detection device 57 itself executed a load instruction in the speculative execution state, the target address of the load instruction is stored in an idle address buffer 31 of the data dependence relationship detection device 57. On the other hand, when a memory operation instruction is executed by another processor 51, 52 or 53, the target address of the instruction is inputted to one of the address coincidence detection circuits 35 corresponding to the processor (51, 52 or 53).

In the address coincidence detection circuit 35 which received the target address, the target address is inputted to all the address comparators 32, thereby the inputted target address is compared with the target addresses (which have been stored in the address buffers 31) of load instructions that have been executed by the processor 50. The comparison results outputted by the address comparators 32 are inputted to the OR circuit 33. The OR circuit 33 obtains the logical sum of the results and inputs the result (logical sum) to the prior thread selection circuit 34.

The prior thread selection circuit 34 (of the processor 50) judges that data dependence is detected if:

(A) the processor 50 is in the speculative execution state,
(B) a store instruction is executed by another processor (51, 52 or 53) that is executing a thread that is prior to the thread executed by the processor 50, and
(C) the coincidence of address is detected by an address coincidence detection circuit 35 that received the target address of the store instruction.

In the case where the data dependence is detected, the fact is informed to the thread control section 54 as a data dependence detection result 49. In this case, the thread control section 54 judges that the thread speculative execution (speculative execution in units of threads) has failed, and starts controlling a recovery process for the failure of the thread speculative execution.

On the other hand, the prior thread selection circuit 34 (of the processor 50) judges that no data dependence is detected if:

(A) the processor 50 is in the speculative execution state,
(B) a store instruction is executed by another processor (51, 52 or 53) that is executing a thread that is prior to the thread executed by the processor 50, and
(C') the coincidence of address is not detected by an address coincidence detection circuit 35 that received the target address of the store instruction.

In the case where no data dependence is detected, the fact is informed to the thread control section 54 as a data dependence detection result 49. In this case, the thread speculative execution is regarded to have succeeded, and thus the execution of threads can be continued without stopping.

When the thread control section 54 is informed (by one of the processors 50, 51, 52 and 53) of a failure of the data dependence speculative execution, the thread control section 54 requests some of the processors (the processor that informed of the failure and one or more other processors that are executing threads that are posterior in the program order to the thread being executed by the aforementioned processor) to execute recovery processes for the data dependence speculative execution failure. The recovery process execution request 47 issued by the thread control section 54 is received by the processor control section 56 of the processors as the targets of the request.

The recovery process execution request 47 is issued not only to the processor that detected and informed of the data dependence speculative execution failure but also to the processors executing threads that are posterior in the program order to the thread in which the failure is found, for the following reasons.

The processor that informed of the failure of the data dependence speculative execution might have carried out the data dependence speculative execution of the load instruction violating a true dependence relationship, therefore, the execution result of the thread (relating to the failure of the data dependence speculative execution) which has been executed by the processor (that informed of the failure) might be incorrect. The execution result of the thread relating to the failure (referred to as "thread A") might have been referred to by another thread (referred to as "thread B") that is posterior in the program order to the thread A, therefore, also the execution result of the posterior thread B might be incorrect.

Similarly, the execution result of the thread B might have been referred to by still another thread (referred to as "thread C") that is posterior in the program order to the thread B, therefore, also the execution result of the posterior thread C might be incorrect.

To sum up, the execution result of any thread that is posterior in the program order to the thread A (executed by the processor that informed of the data dependence speculative execution failure) can be incorrect. Therefore, the recovery process execution request 47 is issued not only to the processor that informed of the data dependence speculative execution failure but also to the processors executing the posterior threads. By such issuance of the recovery process execution request 47, the correctness of the thread execution results is ensured.

The processors that received the recovery process execution requests 47 execute recovery processes for the data dependence speculative execution failure by re-executing the threads etc., thereby the correctness of the thread execution results is ensured.

As mentioned above, the data dependence relationship detection device 57 of each processor has the function for detecting a true dependence relationship of a store instruction of a prior thread (a thread that is prior in the program order to the thread executed by the processor) on a load instruction of the thread executed by the processor. The true dependence relationship detection function is realized since the data dependence relationship detection device 57 is provided with a writing port (for writing a target address when the data dependence speculative execution of a load instruction is executed by the processor) and reading ports corresponding to the other processors (for reading a target address when a store instruction is executed by another processor). By the function, the data dependence speculative execution in units of threads is realized in the multithread parallel processing, thereby the program execution by means of the multithread parallel processing can be speeded up further.

In the data dependence speculative execution in units of threads, when a load instruction is executed speculatively by a processor, the data dependence speculation control device 55 refers to the success/failure result history of the thread speculative execution of the past and thereby predicts the success/failure of the speculative execution. The threads are executed speculatively if the prediction is "success". If the prediction is "failure", the data dependence speculation control device 55 cancels the speculative execution and thereafter controls the program execution so that the threads will be executed non-speculatively in the program order.

The data dependence speculation control device 55 shown in FIG. 8 includes four hash function circuits 59 and a speculative execution result history table 58. The data dependence speculation control device 55 receives the instructions 45, the target addresses 46, and the data dependence relationship detection results 49 from the four processors 50, 51, 52 and 53.

As the input from the thread control section 54, the data dependence speculation control device 55 receives four speculative execution flags 40 corresponding to the four processors 50, 51, 52 and 53. The data dependence speculation control device 55 outputs the data dependence speculative execution result predictions 48 to the processors 50, 51, 52 and 53.

Each hash function circuit 59 of the data dependence speculation control device 55 is a logic circuit that implements a hash function f for converting a target address of a memory operation instruction into an entry number of the speculative execution result history table 58. The hash function f has the property of outputting the same value for the same inputs, that is, if we assume N1=f(A1) and N2=f (A2), N1=N2 holds if A1=A2.

The four hash function circuits 59 are assigned to the four processors 50, 51, 52 and 53 respectively. Each hash function circuit 59 converts the target address of a memory operation instruction executed by a corresponding processor into an entry number of the speculative execution result history table 58. The speculative execution result history table 58 is composed of a plurality of entries, each of which is implemented by memory elements, flip-flops or the like for storing 3-bit information. The number of entries included in the speculative execution result history table 58 is equal to $2^n$ when the hash function circuit 59 has n-bit output.

The speculative execution result history table 58 has four read/write ports (corresponding to the four hash function circuits 59) for executing read/write from/to entries that are designated by the entry numbers outputted by the four hash function circuits 59. Therefore, the speculative execution result history table 58 is capable of executing four read/write processes independently and simultaneously.

In the following, the operation of each processor (hereafter, referred to as "processor 50") for the thread speculative execution in the multithread parallel processing when an instruction is issued to the processor 50 or another processor (51, 52 or 53) will be explained in detail.

Figure 10:
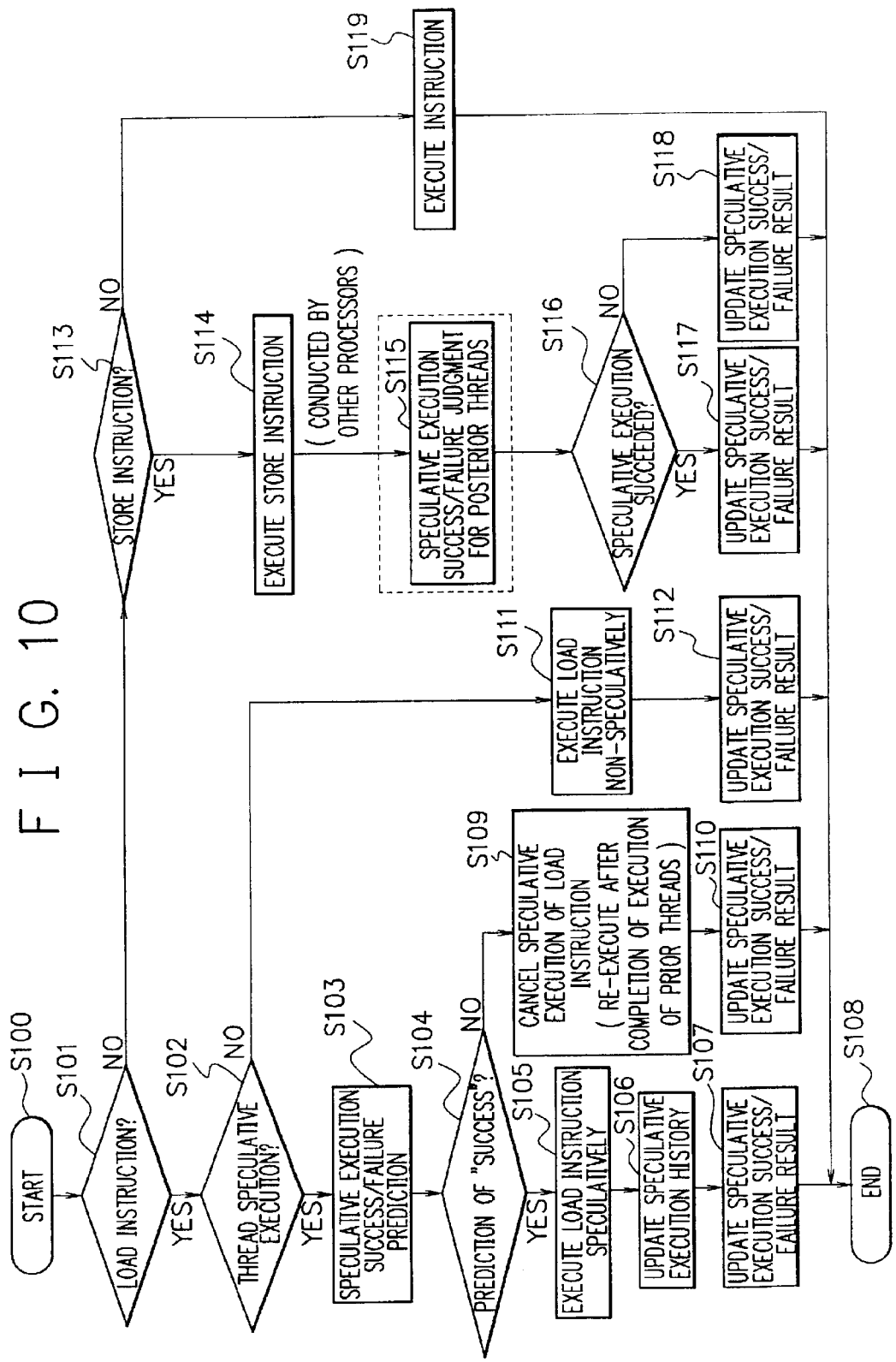
FIG. 10 is a flow chart showing a process executed by a processor and the data dependence speculation control device of the multiprocessor system of FIG. 8 when an instruction is issued to the processor.

FIG. 10 is a flow chart showing a process executed by the processor 50 and the data dependence speculation control device 55 when an instruction is issued to the processor 50. Incidentally, a step S115 is added to FIG. 10 for showing a process that is executed by other processors.

The procedure of FIG. 10 for the instruction issued to the processor 50 starts at step S100 and ends at step S108. First, if the instruction issued by the processor control section 56 of the processor 50 is a load instruction ("YES" in step S101), the process proceeds to step S102. If the instruction is not a load instruction ("NO" in step S101), the process proceeds to step S113.

In the step S102, if the processor 50 is in the speculative execution state (thread speculative execution state) ("YES" in the step S102), the process proceeds to step S103. If the processor 50 is in the non-speculative execution state (thread non-speculative execution state) ("NO" in the step S102), the process proceeds to step S111. Whether the processor 50 is in the speculative execution state or the non-speculative execution state is judged based on the speculative execution flag 40 supplied from the thread control section 54. In the case where the processor 50 is in the speculative execution state (step S103), the data dependence speculation control device 55 carries out the prediction on whether the speculative execution of the load instruction will succeed or fail.

If the prediction by the data dependence speculation control device 55 is "success" ("YES" in the step S104), the process proceeds to step S105. In this case, the speculative execution of the load instruction is carried out (step S105) and the fact (speculative execution of the load instruction) is recorded and stored in the data dependence relationship detection device 57 of the processor 50 (step S106). In the next step S107, the speculative execution success/failure result which has been stored in the data dependence speculation control device 55 is updated by the fact (speculative execution of the load instruction), thereby the speculative execution of the load instruction is finished (step S108).

On the other hand, if the prediction in the step S104 is "failure" ("NO" in the step S104), the speculative execution of the load instruction is canceled (step S109). In this case, the load instruction and instructions (of the thread) following the load instruction are executed later non-speculatively in the program order after the execution of threads prior to the thread executed by the processor 50 is completed. In the next step S110, the speculative execution success/failure result which has been stored in the data dependence speculation control device 55 is updated by the fact (cancellation of the speculative execution), thereby the process for the load instruction is finished with the cancellation (step S108).

In the case where the processor 50 is in the non-speculative execution state ("NO" in the step S102), the load instruction is executed by means of the non-speculative execution (step S111). In the following step S112, the speculative execution success/failure result which has been stored in the data dependence speculation control device 55 is updated by the fact (non-speculative execution of the load instruction), thereby the execution of the load instruction is finished (step S108).

In the step S113, the process proceeds to step S114 if the instruction issued to the processor 50 is a store instruction ("YES" in the step S113). If the issued instruction is neither a load instruction nor a store instruction ("NO" in the step S113), the process proceeds to step S119. Therefore, when a store instruction has been issued to the processor 50, the store instruction is executed in the step S114. In the next step S115, the data dependence relationship detection device 57 of each processor that is executing a thread posterior to the thread executed by the processor 50 makes a judgment on whether the speculative execution with regard to the store instruction has succeeded or failed.

If no speculative execution failure is detected by other processors ("YES" in step S116), the process proceeds to step S117. If speculative execution failure is detected ("NO" in the step S116), the process proceeds to step S118. The data dependence speculation control device 55 is capable of recognizing the results of the speculative execution success/failure judgment by other processors by receiving the data dependence relationship detection results 49.

In the case where no speculative execution failure is detected by other processors ("YES" in step S116), the speculative execution success/failure result stored in the data dependence speculation control device 55 is updated by the fact that the speculative execution has succeeded (step S117), thereby the execution of the store instruction is finished (step S108). On the other hand, in the case where speculative execution failure is detected by another processor ("NO" in step S116), the speculative execution success/failure result stored in the data dependence speculation control device 55 is updated by the fact that the speculative execution has failed (step S118), thereby the execution of the store instruction is finished (step S108).

In the case where the issued instruction is neither a load instruction nor a store instruction ("NO" in the step S113), the instruction is executed (step S119), and thereby the process for the issued instruction is finished (step S108). In this case, the data dependence speculation control device 55 carries out no process.

In the following, the operation of the data dependence speculation control device 55 will be explained in detail referring again to FIGS. 8 and 10.

First, in the step S103 of the flow chart of FIG. 10, the data dependence speculation control device 55 refers to the speculative execution success/failure result history stored in the speculative execution result history table 58 and thereby predicts whether the speculative execution of the current load instruction will succeed or fail. Concretely, the target address 46 of the load instruction which is informed by the processor control section 56 of a processor is inputted to the hash function circuit 59 corresponding to the processor. The hash function circuit 59 converts the target address 46 into an entry number of the speculative execution result history table 58 and inputs the entry number to the speculative execution result history table 58. The speculative execution result history table 58 outputs the contents of the entry designated by the inputted entry number, and the success/failure of the speculative execution of the load instruction is predicted based on the contents of the entry.

In the steps S107, S110, S112, S117 and S118 of the flow chart of FIG. 10, the speculative execution success/failure result history which is stored in the speculative execution result history table 58 is updated based on the flow. Concretely, the target address 46 of the load/store instruction which is informed by the processor control section 56 of each processor is converted by the hash function circuit 59 corresponding to the processor into an entry number of the speculative execution result history table 58 and the entry number is inputted to the speculative execution result history table 58. The speculative execution result history table 58 outputs the contents of the entry designated by the inputted entry number, and the contents of the entry is updated based on the current contents of the entry and the flow. Incidentally, the state transitions of each entry of the speculative execution result history table 58 occur in the same way as those of the speculative execution result history table 12 of the first embodiment, as shown in FIG. 5.

In the second embodiment, the expression "LOAD" (load instruction) in FIG. 5 means a load instruction that is executed by the processor (the processor in the step S107, S110, S112, S117 or S118 of FIG. 8), and the expression "STORE" (store instruction) means a store instruction that is executed by another processor that is executing a thread prior to the thread executed by the processor (the processor in the step S107, S110, S112, S117 or S118 of FIG. 8).

Each entry of the speculative execution result history table 58 is composed of memory elements of 3 bits, by which the eight states (speculative execution success/failure historical states) which have been explained in the first embodiment can be expressed. The meanings of the eight historical states have been explained in the first embodiment, therefore, repeated explanation thereof is omitted.

In the speculative instruction execution in the multithread parallel processing, the speculative execution success/failure prediction of the step S103 of the flow chart of FIG. 10 is carried out based on a 3-bit code ("000", "001", "010", "011", "100", "101", "110" or "111") that is held by the referred entry of the speculative execution result history table 58. If the referred entry holds a 3-bit code corresponding to the "strong success #0", the "strong success #1", the "weak success #0" or the "weak success #1", it is judged that the probability of success of the current speculative execution is high, thereby the load instruction is executed speculatively.

If the referred entry holds a 3-bit code corresponding to the "weak failure #0", the "weak failure #1", the "strong failure #0" or the "strong failure #1", it is judged that the probability of success of the current speculative execution is low (the probability of failure is high), thereby the speculative execution of the load instruction is canceled. The load instruction is executed later in the in-order execution by means of the non-speculative thread execution.

State transitions among the eight states take place in the steps S107, S110, S112, S117 and S118 as will be explained below. In the initial state, each entry stays in an arbitrary state.

When an entry is staying in the "weak success #0" 92 (see FIG. 5), if a speculative load instruction having the target address corresponding to the entry is issued, the entry is changed from the "weak success #0" 92 to the "weak success #1" 93 in the step S107. In this case, the speculative execution of the load instruction is expected (in the speculative execution success/failure prediction of the step S103) to succeed, therefore, the load instruction is actually executed by means of the speculative execution (step S105). The other steps (steps S110, S112, S117 and S118) cause no state transition to the entry staying in the "weak success #0" 92.

When an entry is staying in the "weak success #1" 93, if a store instruction having the target address corresponding to the entry is executed by another processor and thereafter no load instruction speculative execution failure is detected in the step S115, due to the success of the load instruction speculative execution, the entry is changed from the "weak success #1" 93 to the "strong success #0" 90 in the step S117.

On the other hand, if a load instruction speculative execution failure is detected in the step S115, due to the failure of the load instruction speculative execution, the entry is changed from the "weak success #1" 93 to the "weak failure #0" 94 in the step S118. The other steps (steps S107, S110 and S112) cause no state transition to the entry staying in the "weak success #1" 93.

When an entry is staying in the "strong success #0" 90, if a speculative load instruction having the target address corresponding to the entry is issued, the entry is changed from the "strong success #0" 90 to the "strong success #1" 91 in the step S107. In this case, the speculative execution of the load instruction is expected (in the speculative execution success/failure prediction of the step S103) to succeed, therefore, the load instruction is actually executed by means of the speculative execution (step S105). The other steps (steps S110, S112, S117 and S118) cause no state transition to the entry staying in the "strong success #0" 90.

When an entry is staying in the "strong success #1" 91, if a store instruction having the target address corresponding to the entry is executed by another processor and thereafter no load instruction speculative execution failure is detected in the step S115, due to the success of the load instruction speculative execution, the entry is changed from the "strong success #1" 91 to the "strong success #0" 90 in the step S117.

On the other hand, if a load instruction speculative execution failure is detected in the step S115, due to the failure of the load instruction speculative execution, the entry is changed from the "strong success #1" 91 to the "weak success #0" 92 in the step S118. The other steps (steps S107, S110 and S112) cause no state transition to the entry staying in the "strong success #1" 91.

When an entry is staying in the "weak failure #0" 94, if a speculative load instruction having the target address corresponding to the entry is issued, the entry is changed from the "weak failure #0" 94 to the "weak failure #1" 95 in the step S110. In this case, the speculative execution of the load instruction is expected (in the speculative execution success/failure prediction of the step S103) to fail, therefore, the load instruction is not actually executed by means of the speculative execution. The other steps (steps S107, S112, S117 and S118) cause no state transition to the entry staying in the "weak failure #0" 94.

When an entry is staying in the "weak failure #1" 95, if a store instruction having the target address corresponding to the entry is executed by another processor, the probability of success of the speculative execution of a load instruction related to the entry is regarded to be low, and thus the entry is changed from the "weak failure #1" 95 to the "strong failure #0" 96 in the step S117 or S118. In this case, the success probability of the load instruction speculative execution is regarded to be low since the entry changed from the "weak failure #0" 94 to the "weak failure #1" 95 due to the issuance of a speculative load instruction and thereafter the store instruction having the same target address was issued.

Actually, the speculative execution of the load instruction is expected (in the speculative execution success/failure prediction of the step S103) to fail, therefore, the speculative execution of the load instruction is canceled and the load instruction is executed later by means of the non-speculative execution. Even if the load instruction were executed speculatively, the speculative execution would have failed.

Meanwhile, when an entry is staying in the "weak failure #1" 95, if a non-speculative load instruction having the target address corresponding to the entry is issued, the probability of success of the speculative execution of a load instruction related to the entry is regarded to be high, and thus the entry is changed from the "weak failure #1" 95 to the "weak success #0" 92 in the step S110. In this case, the success probability of the load instruction speculative execution is regarded to be high since the entry changed from the "weak failure #0" 94 to the "weak failure #1" 95 due to the issuance of a speculative load instruction and thereafter the non-speculative load instruction was issued after no issuance of a store instruction having the same target address.

The non-speculative load instruction is regarded to be a load instruction that has been executed non-speculatively due to a speculative execution failure prediction, and no store instruction having the same target address has been issued between the issuance of the two load instructions. Therefore, if the load instruction were executed speculatively, the speculative execution would have succeeded. The other steps (steps S107 and S112) cause no state transition to the entry staying in the "weak failure #1" 95.

When an entry is staying in the "strong failure #0" 96, if a speculative load instruction having the target address corresponding to the entry is issued, the entry is changed from the "strong failure #0" 96 to the "strong failure #1" 97 in the step S110. In this case, the speculative execution of the load instruction is expected (in the speculative execution success/failure prediction of the step S103) to fail, therefore, the load instruction is not actually executed by means of the speculative execution. The other steps (steps S107, S112, S117 and S118) cause no state transition to the entry staying in the "strong failure #0" 96.

When an entry is staying in the "strong failure #1" 97, if a store instruction having the target address corresponding to the entry is executed by another processor, the probability of success of the speculative execution of a load instruction related to the entry is regarded to be low, and thus the entry is changed from the "strong failure #1" 97 to the "strong failure #0" 96 in the step S117 or S118. In this case, the success probability of the load instruction speculative execution is regarded to be low since the entry changed from the "strong failure #0" 96 to the "strong failure #1" 97 due to the issuance of a speculative load instruction and thereafter the store instruction having the same target address was issued.

Actually, the speculative execution of the load instruction is expected (in the speculative execution success/failure prediction of the step S103) to fail, therefore, the speculative execution of the load instruction is canceled and the load instruction is executed later by means of the non-speculative execution. Even if the load instruction were executed speculatively, the speculative execution would have failed.

Meanwhile, when an entry is staying in the "strong failure #1" 97, if a non-speculative load instruction having the target address corresponding to the entry is issued, the probability of success of the speculative execution of a load instruction relating the entry is regarded to be high, and thus the entry is changed from the "strong failure #1" 97 to the "weak failure #0" 94 in the step S110. In this case, the success probability of the load instruction speculative execution is regarded to be high since the entry changed from the "strong failure #0" 96 to the "strong failure #1" 97 due to the issuance of a speculative load instruction and thereafter the non-speculative load instruction was issued after no issuance of a store instruction having the same target address.

The non-speculative load instruction is regarded to be a load instruction that has been executed in the non-speculative execution due to a speculative execution failure prediction, and no store instruction having the same target address has been issued between the issuance of the two load instructions. Therefore, if the load instruction were executed speculatively, the speculative execution would have succeeded. The other steps (steps S107 and S112) cause no state transition to the entry staying in the "strong failure #1" 97.

As explained above, when the success probability of the speculative execution relating to an entry of the speculative execution result history table 58 is high, the state of the entry changes as "strong failure"→"weak failure"→"weak success"→"strong success". On the other hand, when the success probability of the speculative execution relating to an entry is low, the state of the entry changes as "strong success"→"weak success"→"weak failure"→"strong failure".

In the speculative execution success/failure prediction of the step S103, when the entry stays in the "weak success" or the "strong success", the speculative execution is expected to succeed and thereby the load instruction is executed by means of the speculative execution. When the entry stays in the "strong failure" or the "weak failure", the speculative execution is expected to fail, thereby the speculative execution of the load instruction is cancelled and the load instruction is executed later in the program order by means of the non-speculative execution. By the data dependence speculation control device 55 of the second embodiment, for the speculative execution with regard to the true dependence relationship between threads in the multithread parallel processing, the load instruction speculative execution whose success probability is low is cancelled and the load instruction is executed later by means of the non-speculative execution, thereby the failure rate of the speculative execution is reduced and thereby the program execution performance is improved.

In the following, a concrete example of the data dependence speculative execution in the multithread parallel processing in accordance with the second embodiment of the present invention will be explained in detail. FIG. 11 is a schematic diagram showing the program order of instructions that are included in a program as an example. The program order shown in FIG. 11 is a typical one that can be seen in a program having loop structure, in which an instruction sequence which is composed of sixteen instructions (five load instructions LD1, LD2, LD3, LD4 and LD5, three store instructions ST1, ST2 and ST3, and eight non-load/store instructions) is repeatedly executed.

In FIG. 11, instructions of only two consecutive loops #0 and #1 are shown for the sake of simplicity. Blank squares in FIG. 11 denote the non-load/store instructions. Each loop is composed of the program order of a load instruction LD1, two non-load/store instructions, a store instruction ST1, a non-load/store instruction, a load instruction LD2, a store instruction ST2, three non-load/store instructions, a load instruction LD3, a load instruction LD4, a load instruction LD5, a store instruction ST3, and two non-load/store instructions.

The target addresses of the load instructions LD1, LD2, LD3, LD4 and LD5 are assumed to be A1, A2, A3, A4 and A5, respectively. The target addresses of the store instructions ST1, ST2 and ST3 are assumed to be A3, A1 and A3, respectively.

In this example, the program having the program order of FIG. 11 is executed by the four processors 50, 51, 52 and 53 which are show in FIG. 8 by means of the data dependence speculative execution in units of threads. Concretely, each loop which is composed of sixteen instructions is segmented into four threads each of which includes four instructions, and the four threads are executed in parallel by the four processors.

Therefore, a thread #0 (including the load instruction LD1, the two non-load/store instructions and the store instruction ST1), a thread #1 (including the non-load/store instruction, the load instruction LD2, the store instruction ST2 and the non-load/store instruction), a thread #2(including the two non-load/store instructions, the load instruction LD3 and the load instruction LD4), and a thread #3 (including the load instruction LD5, the store instruction ST3 and the two non-load/store instructions) are extracted from the program in the program order, and the threads #0, #1, #2 and #3 are executed in parallel by the processors 50, 51, 52 and 53 respectively. The assignment of threads to the processors 50, 51, 52 and 53 is carried out by the thread control section 54.

In the above case, if there is no dependence relationship among the instructions which are included in the four threads #0–#3, the sixteen instructions can be executed in only four cycles by the multithread parallel processing by the four processors. However, there exists a data dependence relationship between the instructions ST1 and LD3 since the instructions LD3 and ST1 have the same target addresses A3 and the store instruction ST1 is prior to the load instruction LD3 in the program order.

Therefore, the correctness of the program execution result is not guaranteed unless the store instruction ST1 is executed prior to the load instruction LD3, that is, unless data which has been written in the address A3 by the store instruction ST1 is read out from the address A3 by the load instruction LD3. In the parallel processing in units of threads, there exists a true dependence relationship of the thread #0(including the store instruction ST1) on the thread #2 (including the load instruction LD3).

However, the true dependence relationship of the store instruction ST1 on the load instruction LD3 (i.e. the true dependence relationship of the thread #0 on the thread #2) is generally not clear yet at the point when the thread control section 54 assigns the threads to the processors 50, 51, 52 and 53. Therefore, when the multithread parallel processing is carried out non-speculatively, if the absence of the true dependence relationship is not clear between any two threads, the two threads have to be executed one after another in the program order in order to preserve (so as not to violate) the (unknown) true dependence relationship. Therefore, the speeding up of the program execution by means of the multithread parallel processing can not be attained enough.

In the data dependence speculative execution in units of threads, the parallel execution of threads is carried out speculatively even if the presence/absence of the true dependence relationship between threads is not clear yet. If the probability of success of the data dependence speculative execution is high enough, the speeding up of the program execution by means of the multithread parallel processing can be attained.

Figure 12A:
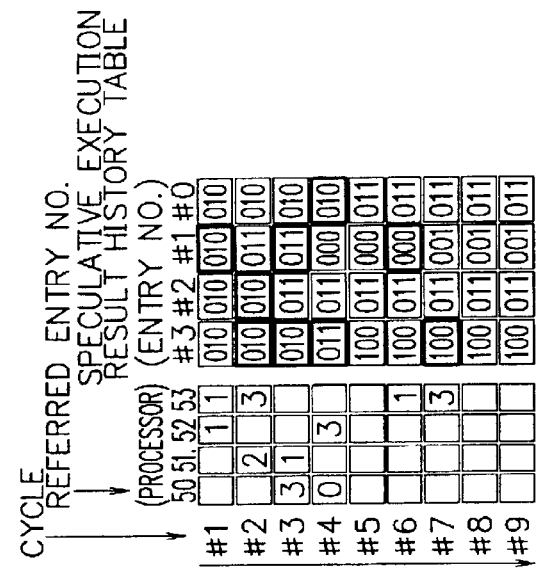
FIG. 12A is a schematic diagram showing an example of multithread parallel processing by means of data dependence speculative execution in units of threads which is carried out for the program of FIG. 11.

FIG. 12A is a schematic diagram showing an example of the multithread parallel processing by means of the data dependence speculative execution in units of threads which is carried out for the program of FIG. 11. Starting from the left, each row of FIG. 12A includes a cycle number, an instruction to be executed in the cycle by the processor 50 which is executing the thread #2, the target address of the executed instruction, an instruction to be executed in the cycle by the processor 51 which is executing the thread #1, the target address of the executed instruction, an instruction to be executed in the cycle by the processor 52 which is executing the thread #0, the target address of the executed instruction, an instruction to be executed in the cycle by the processor 53 which is executing the thread #3, and the target address of the executed instruction.

Therefore, the processor 50 executing the thread #2 executes two non-load/store instructions in the cycles #1 and #2, the load instruction LD3 in the cycle #3, and the load instruction LD4 in the cycle #4. The processor 51 executing the thread #1 executes a non-load/store instruction in the cycle #1, the load instruction LD2 in the cycle #2, the store instruction ST2 in the cycle #3, and a non-load/store instruction in the cycle #4. The processor 52 executing the thread #0 executes the load instruction LD1 in the cycle #1, two non-load/store instructions in the cycles #2 and #3, and the store instruction ST1 in the cycle #4. The processor 53 executing the thread #3 executes the load instruction LD5 in the cycle #1, the store instruction ST3 in the cycle #2, and two non-load/store instructions in the cycles #3 and #4.

The thread #0 is the thread at the head of the program order, therefore, there exists no true dependence relationship of a store instruction included in the threads #1–#3 on a load instruction included in the thread #0. Therefore, the processor 52 can execute the thread #0by means of the non-speculative execution.

On the other hand, the presence/absence of the true dependence relationship is not clear with regard to the threads #1–#3, therefore, the processor 50, 51 and 53 execute the threads #1–#3 by means of the data dependence speculative execution. If the data dependence speculative execution succeeds in the example of FIG. 12A, the loop including sixteen instructions can be executed in only four cycles and thereby the program execution performance can be improved considerably.

However, in the example of the loop #0 shown in FIG. 12A, referring to the instructions ST1 and LD3 having the true dependence relationship, the load instruction LD3 is executed by the processor 50 in the cycle #3 and thereafter the store instruction ST1 is executed by the processor 52 in the cycle #4, in which the true dependence relationship is violated, thereby it becomes impossible to obtain the correct program execution result.

In other words, the data dependence speculative execution of the thread #2 by the processor 50 has failed. The data dependence relationship detection device 57 of the processor 50 has the function for detecting the true dependence relationship of the store instruction ST1 (executed by the processor 52) on the load instruction LD3 (executed by the processor 50) and informing the thread control section 54 about the data dependence speculative execution failure of the thread #2.

On receiving the information of the data dependence speculative execution failure from the processor 50, the thread control section 54 requests the processor 50 and the processor 53 (which is executing the thread #3 which is posterior in the program order to the thread #2 whose data dependence speculative execution has failed) to carry out recovery processes for the data dependence speculative execution failure (cancellation of thread execution results, re-execution of the threads, etc.) so that a correct program execution result can be obtained.

Figure 12B:
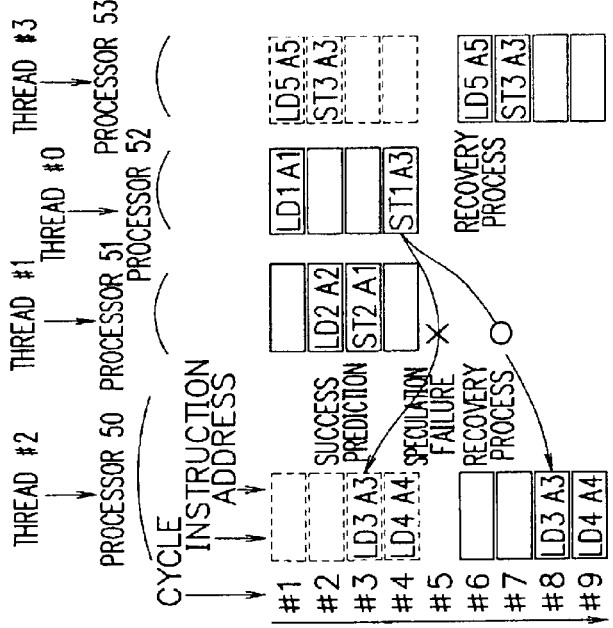
FIG. 12B is a schematic diagram showing the operation of the data dependence speculation control device of the second embodiment.

FIG. 12B is a schematic diagram showing the operation of the data dependence speculation control device 55. Starting from the left, each row of FIG. 12B includes a cycle number, entry numbers (of the speculative execution result history table 58) that are referred to by each of the processors 50, 51, 52 and 53 in the cycle, and the state of the speculative execution result history table 58 in the cycle. The speculative execution result history table 58 is composed of four entries #0–#3, and the state of the speculative execution result history table 58 includes the contents of the entry #0, the contents of the entry #1, the contents of the entry #2 and the contents of the entry #3, starting from the right. For example, in the cycle #1 of the loop #0, the contents are "010 (weak success #0)" for all the entries #0–#3.

In the cycle #1 of the loop #0, the non-load/store instruction of the thread #2 is issued in the processor 50, the non-load/store instruction of the thread #1 is issued in the processor 51, the load instruction LD1 of the thread #0 is issued in the processor 52, and the load instruction LD5 of the thread #3 is issued in the processor 53. As for the load instruction LD5 which is issued by the processor 53, the presence/absence of the true dependence relationship of a store instruction of a prior thread (thread #0, #1 or #2 which is prior in the program order to the thread #3 being executed by the processor 53) on the load instruction LD5 is not clear yet. Therefore, the load instruction LD5 becomes the candidate of the speculative execution with regard to the true dependence relationship.

Prior to the speculative execution, the processor 53 carries out the speculative execution success/failure prediction by use of the data dependence speculation control device 55 (step S103 of FIG. 10). Concretely, the target address A5 of the load instruction LD5 is converted by the hash function circuit 59 (corresponding to the processor 53) into an entry number of the speculative execution result history table 58. If we assume that the hash function circuit 59 outputted an entry number "1" (#1), the speculative execution success/failure historical state "010" (weak success #0) stored in the entry #1 is read out from the speculative execution result history table 58. By the state "010" (weak success #0), the speculative execution is expected to succeed, therefore, the load instruction LD5 is executed speculatively (step S105 of FIG. 10).

Meanwhile, the thread #0 executed by the processor 52 is the thread at the head of the program order, and thus the load instruction LD1 is executed by the processor 52 non-speculatively (step S111 of FIG. 10). If we assume that the target address A1 of the load instruction LD1 is converted by the hash function circuit 59 (corresponding to the processor 52) into an entry number "1" (#1), the entry #1 of the speculative execution result history table 58 is referred to by both the processors 52 and 53 simultaneously. However, the data dependence speculation control device 55, having four independent ports corresponding to the processors 50, 51, 52 and 53, can handle the processes of the processors 52 and 53 concurrently. In this case, the entry #1 changes from "010" (weak success #0) to "011" (weak success #1) since the speculative execution of the load instruction LD5 was carried out by the processor 53.

In the next cycle #2 of the loop #0, the non-load/store instruction of the thread #2 is issued in the processor 50, the load instruction LD2 of the thread #1 is issued in the processor 51, the non-load/store instruction of the thread #0 is issued in the processor 52, and the store instruction ST3 of the thread #3 issued in the processor 53.

The load instruction LD2 issued by the processor 51 is speculative with regard to the store instruction included in the thread #0 (which is prior to the thread #1 executed by the processor 51). Therefore, the processor 51 carries out the speculative execution success/failure prediction by use of the data dependence speculation control device 55 (step S103 of FIG. 10). Concretely, the target address A2 of the load instruction LD2 is converted by the hash function circuit 59 (corresponding to the processor 51) into an entry number of the speculative execution result history table 58. If we assume that the hash function circuit 59 outputted an entry number "2" (#2), the speculative execution success/failure historical state "010" (weak success #0) stored in the entry #2 is read out from the speculative execution result history table 58. By the state "010" (weak success #0), the speculative execution is expected to succeed, therefore, the load instruction LD2 is executed speculatively (step S105 of FIG. 10). In this case, the entry #2 changes from "010" (weak success #0) to "011" (weak success #1) (step S107 of FIG. 10).

As for the store instruction ST3 which is executed by the processor 53, the threads #0. #1 and #2 executed by the other processors 50, 51 and 52 are all prior to the thread #3 which is executed by the processor 53, therefore, no speculative execution failure is detected with regard to the store instruction ST3. Therefore, the entry #3 of the speculative execution result history table 58 does not change from "010" (weak success #0) (step S117 of FIG. 10).

In the next cycle #3 of the loop #0, the load instruction LD3 of the thread #2 is issued in the processor 50, the store instruction ST2 of the thread #1 is issued in the processor 51, the non-load/store instruction of the thread #0 is issued in the processor 52, and the non-load/store instruction of the thread #3 is issued in the processor 53.

The load instruction LD3 issued by the processor 50 is speculative with regard to the store instructions included in the threads #0 and #1which are prior to the thread #2 executed by the processors 50. Therefore, the processor 50 carries out the speculative execution success/failure prediction by use of the data dependence speculation control device 55 (step S103 of FIG. 10). Concretely, the target address A3 of the load instruction LD3 is converted by the hash function circuit 59 (corresponding to the processor 50) into an entry number of the speculative execution result history table 58. If we assume that the hash function circuit 59 outputted an entry number "3" (#3), the speculative execution success/failure historical state "010" (weak success #0) stored in the entry #3 is read out from the speculative execution result history table 58. By the state "010" (weak success #0), the speculative execution is expected to succeed, therefore, the load instruction LD3 is executed speculatively (step S105 of FIG. 10). In this case, the entry #3 changes from "010" (weak success #0) to "011" (weak success #1) (step S107 of FIG. 10).

For the store instruction ST2 which is executed by the processor 51, the speculative execution success/failure judgment is carried out by the data dependence relationship detection devices 57 of the processors 50 and 53 (which are executing the threads #2 and #3 which are posterior to the thread #1 including the store instruction ST2) (step S115 of FIG. 10). In this case, no speculative execution failure is detected by the processors 50 and 53 and thereby the speculative execution with regard to the store instruction ST2 is judged to have succeeded. Therefore, the entry #1 of the speculative execution result history table 58 changes from "011" (weak success #1) to "000" (strong success #0) (step S117 of FIG. 10).

In the next cycle #4 of the loop #0, the load instruction LD4 of the thread #2 is issued in the processor 50, the non-load/store instruction of the thread #1 is issued in the processor 51, the store instruction ST1 of the thread #0 is issued in the processor 52, and the non-load/store instruction of the thread #3 is issued in the processor 53.

The load instruction LD4 issued by the processor 50 is speculative with regard to the store instructions included in the threads #0 and #1 (which are prior to the thread #2 executed by the processor 50). Therefore, the processor 50 carries out the speculative execution success/failure prediction by use of the data dependence speculation control device 55 (step S103 of FIG. 10). Concretely, the target address A4 of the load instruction LD4 is converted by the hash function circuit 59 (corresponding to the processor 50) into an entry number of the speculative execution result history table 58. If we assume that the hash function circuit 59 outputted an entry number "010" (#0), the speculative execution success/failure historical state "010" (weak success #0) stored in the entry #0 is read out from the speculative execution result history table 58. By the state "010" (weak success #0), the speculative execution is expected to succeed, therefore, the load instruction LD4 is executed speculatively (step S105 of FIG. 10). In this case, the entry #0 changes from "010" (weak success #0) to "011" (weak success #1) (step S107 of FIG. 10).

Meanwhile, for the store instruction ST1 which is executed by the processor 52, the speculative execution success/failure judgment is carried out by the data dependence relationship detection devices 57 of the processors 51, 50 and 53 (which are executing the threads #1, #2 and #3 which are posterior to the thread #0 including the store instruction ST1) (step S115 of FIG. 10). In this case, no speculative execution failure is detected by the processors 50 and 53 and thereby the speculative execution with regard to the store instruction ST2 is judged to have succeeded. Therefore, the entry #1 of the speculative execution result history table 58 changes from "011" (weak success #1) to "000" (strong success #0) (step S117 of FIG. 10).

In this case, the load instruction LD3 having the same target address A3 as the store instruction ST1 has already been executed speculatively in the cycle #3 before the execution of the store instruction ST1, and the load instruction LD3 is posterior to the store instruction ST1 in the program order. Therefore, the failure of the speculative execution of the load instruction LD3 is detected by the data dependence relationship detection device 57 of the processor 50, and the failure is informed to the thread control section 54 as the data dependence relationship detection result 49. Due to the information, the thread control section 54 requests the processor 50 and the processor 53 (which has been executing the thread #3 which is posterior to the thread #2 executed by the processor 50) to carry out the recovery processes for the data dependence speculative execution failure so that a correct program execution result can be obtained.

In the processors 50 and 53 executing the recovery processes, the instruction execution results between the cycle #1 and the cycle #4 are canceled and the threads #2 and #3 are executed again.

Meanwhile, in the speculative execution result history table 58, due to the detection of the speculative execution failure with regard to the store instruction ST1 in the cycle #4, the entry #3 changes from "011" (weak success #1) to "100" (weak failure #0) (step S118 of FIG. 10).

In the recovery process by the processor 50 for the speculative execution failure of the thread #2, the processor 50 re-executes the two non-load/store instructions in the cycles #6 and #7, the load instruction LD3 in the cycle #8, and the load instruction LD4 in the cycle #9. In the re-execution of the thread #2 in the recovery process, the thread #2 is the thread at the head, therefore, the processor 50 can execute the thread #2 by means of the non-speculative execution.

In the recovery process by the processor 53 for the speculative execution failure of the thread #3, the processor 53 re-executes the load instruction LD5 in the cycle #6, the store instruction ST3 in the cycle #7, and the two non-load/ store instructions in the cycles #8 and #9. In the re-execution of the thread #3 in the recovery process, the dependence relationship with the thread #2 is not clear yet, therefore, the processor 53 executes the thread #3 by means of the speculative execution again.

The change of the speculative execution result history table 58 relating to the speculative execution in the recovery process for the thread #3 is as follows.

In the cycle #6, the processor 53 carries out the speculative execution success/failure prediction for the load instruction LD5 by use of the data dependence speculation control device 55 (step S103 of FIG. 10). From the entry #1 of the speculative execution result history table 58, "000" (strong success #0) is read out, thereby the speculative execution is expected to succeed, therefore, the load instruction LD5 is executed speculatively (step S105 of FIG. 10). In this case, the entry #1 changes from "000" (strong success #0) to "001" (strong success #1) (step S107 of FIG. 10).

In the next cycle #7, the store instruction ST3 is executed. The entry #3 of the speculative execution result history table 58 does not change from "100" (weak failure #0).

The operation of the data dependence speculation control device 55 and the instruction execution in the loop #0 are as explained above. While the speculative execution success/ failure prediction for the load instruction LD3 of the thread #2 was "success", the speculative execution failed in reality and the recovery processes for the speculative execution failure of the threads #2 and #3 became necessary. Due to the failure, the execution of the sixteen instructions (threads #0–#3) by the four processors 50, 51, 52 and 53 needed as long as nine cycles in the loop #0.

Next, the operation in the next loop #1 will be explained. In the cycle #1 of the loop #1, the non-load/store instruction of the thread #2 is issued in the processor 50, the non-load/store instruction of the thread #1 is issued in the processor 51, the load instruction LD1 of the thread #0 is issued in the processor 52, and the load instruction LD5 of the thread #3 is issued in the processor 53. As for the load instruction LD5 which is issued by the processor 53, the presence/absence of the true dependence relationship of a store instruction of a prior thread (thread #0, #1 or #2 which is prior in the program order to the thread #3 being executed by the processor 53) on the load instruction LD5 is not clear yet. Therefore, the load instruction LD5 becomes the candidate of the speculative execution with regard to the true dependence relationship.

Prior to the speculative execution, the processor 53 carries out the speculative execution success/failure prediction by use of the data dependence speculation control device 55 (step S103 of FIG. 10). From the entry #1 of the speculative execution result history table 58, "001" (strong success #1)

is read out, thereby the speculative execution is expected to succeed, therefore, the load instruction LD5 is executed speculatively (step S105 of FIG. 10).

Meanwhile, the thread #0 executed by the processor 52 is the thread at the head of the program order, and thus the load instruction LD1 is executed by the processor 52 non-speculatively (step S111 of FIG. 10). In this case, the entry #1 of the speculative execution result history table 58 does not change from "001" (strong success #1).

In the next cycle #2 of the loop #1, the non-load/store instruction of the thread #2 is issued in the processor 50, the load instruction LD2 of the thread #1 is issued in the processor 51, the non-load/store instruction of the thread #0 is issued in the processor 52, and the store instruction ST3 of the thread #3 issued in the processor 53.

The load instruction LD2 issued by the processor 51 is speculative with regard to the store instruction included in the thread #0 (which is prior to the thread #1 executed by the processor 51). Therefore, the processor 51 carries out the speculative execution success/failure prediction by use of the data dependence speculation control device 55 (step S103 of FIG. 10). From the entry #2 of the speculative execution result history table 58, "011" (weak success #1) is read out, thereby the speculative execution is expected to succeed, therefore, the load instruction LD2 is executed speculatively (step S105 of FIG. 10). In this case, the entry #2 does not change from "011" (weak success #1) (step S107 of FIG. 10).

As for the store instruction ST3 which is executed by the processor 53, the threads #0. #1 and #2 executed by the other processors 50, 51 and 52 are all prior to the thread #3 which is executed by the processor 53, therefore, no speculative execution failure is detected with regard to the store instruction ST3. Therefore, the entry #3 of the speculative execution result history table 58 does not change from "100" (weak failure #0) (step S117 of FIG. 10).

In the next cycle #3 of the loop #1, the load instruction LD3 of the thread #2 is issued in the processor 50, the store instruction ST2 of the thread #1 is issued in the processor 51, the non-load/store instruction of the thread #0 is issued in the processor 52, and the non-load/store instruction of the thread #3 is issued in the processor 53.

The load instruction LD3 issued by the processor 50 is speculative with regard to the store instructions included in the threads #0 and #1 which are prior to the thread #2 executed by the processors 50. Therefore, the processor 50 carries out the speculative execution success/failure prediction by use of the data dependence speculation control device 55 (step S103 of FIG. 10). From the entry #3 of the speculative execution result history table 58, "100" (weak failure #0) is read out, thereby the speculative execution of the load instruction LD3 is expected to fail, therefore, the speculative execution of the load instruction LD3 is canceled and the load instruction LD3 is executed later non-speculatively in the program order (step S109 of FIG. 10). In this case, the entry #3 changes from "100" (weak failure #0) to "101" (weak failure #1) (step S110 of FIG. 10).

For the store instruction ST2 which is executed by the processor 51, the speculative execution success/failure judgment is carried out by the data dependence relationship detection devices 57 of the processors 50 and 53 (which are executing the threads #2 and #3 which are posterior to the thread #1 including the store instruction ST2) (step S115 of FIG. 10). In this case, no speculative execution failure is detected by the processors 50 and 53 and thereby the speculative execution with regard to the store instruction ST2 is judged to have succeeded. Therefore, the entry #1 of the speculative execution result history table 58 changes from "001" (strong success #1) to "000" (strong success #0) (step S117 of FIG. 10).

In the next cycle #4 of the loop #1, the processor 50 executing the thread #2 can not execute the load instruction LD3 (whose speculative execution was canceled in the cycle #3) non-speculatively with regard to the dependence relationships with the threads #0 and #1, since the execution of the threads #0 and #1 (which are prior in the program order to the thread #2) have not been completed yet. Therefore, the execution of the load instruction LD3 is suspended.

Meanwhile, the processors 51, 52 and 53 execute the non-load/store instruction of the thread #1, the store instruction ST1 of the thread #0 and the non-load/store instruction of the thread #3, respectively. For the store instruction ST1 which is executed by the processor 52, the speculative execution success/failure judgment is carried out by the data dependence relationship detection devices 57 of the processors 51, 50 and 53 (which are executing the threads #1, #2 and #3 which are posterior to the thread #0 including the store instruction ST1) (step S115 of FIG. 10).

Differently from the case of the loop #0, the speculative execution of the load instruction LD3 has been canceled in the loop #1, and thus no speculative execution failure is detected with regard to the store instruction ST1. Therefore, the execution of the threads #0, #1 and #3 is completed in the cycle #4. Due to the success of the speculative execution with regard to the store instruction ST1, the entry #3 of the speculative execution result history table 58 changes from "101" (weak failure #1) to "110" (strong failure #0) (step S117 of FIG. 10).

In the next cycle #5 of the loop #1, the non-speculative execution of the load instruction LD3 (whose speculative execution was canceled due to the failure detection in the step #3 and whose non-speculative execution was suspended in the step #4) becomes possible, therefore, the processor 50 executes the load instruction LD3 non-speculatively.

In the next cycle #6 of the loop #1, the processor 50 executes the load instruction LD4 non-speculatively.

As described above, in the multithread parallel processing which is executed by a multiprocessor system, the data dependence speculation control device 55 of the second embodiment cancels the speculative execution for a load instruction whose speculative execution is expected to fail, and executes the load instruction later in the program order by means of the non-speculative execution, thereby the failure rate of the speculative execution is reduced and thereby the program execution performance is improved.

In the above instruction execution in the loop #1 and the operation of the data dependence speculation control device 55, the speculative execution success/failure prediction for the load instruction LD3 of the thread #2 ("failure") was done correctly and thereby the speculative execution failure of the load instruction LD3 was avoided. Due to the avoidance of failure, the number of cycles necessary for the execution of the sixteen instructions (threads #0–#3) was decreased from nine of the loop #0 to six in the loop #1.

By the data dependence speculation control device 55, when the data dependence speculative execution in units of threads is carried out in the multithread parallel processing in a multiprocessor system, the speculative execution success/failure result history concerning instructions of the past is referred to and thereby whether the speculative execution of the current load instruction will succeed or fail is predicted. If the prediction is "success", the load instruction is executed by means of the speculative execution, and otherwise (if the prediction is "failure"), the speculative execution is canceled and the load instruction is executed later in the program order by means of the non-speculative execution. Therefore, by the data dependence speculation control device 55, the failure rate of the speculative execution can be lowered by selectively carrying out the load instruction speculative execution whose success probability is high, thereby the delay caused by the recovery process for the speculative execution failure can be minimized and thereby the program execution performance can be improved significantly.

In the above program (loop) including sixteen instructions, the multithread parallel processing by use of four processors required nine cycles in the loop #0 in which a speculative execution failure occurred, whereas the loop #1 in which the speculative execution success/failure prediction succeeded was completed in only six cycles and the program execution performance was improved much. While each thread included only four instructions in the above example, a thread is generally composed of tens to tens of thousands of instructions. Therefore, the data dependence speculation control device 55 of the second embodiment can achieve dramatic effects on the improvement of performance in practical use.

The data dependence speculation control device 55 of the second embodiment allows the existence of the "arias" concerning the target addresses of the load instructions for carrying out the speculative execution success/failure prediction. By allowing the aliases, the need for storing all the target addresses for the success/failure prediction is eliminated, thereby the limitation on the number of load instructions (to which the speculative execution success/failure prediction can be carried out) is eliminated and the improvement of the program execution performance by use of the data dependence speculative execution can be attained with a small amount of hardware.

There is no need of the comparison of the target addresses between load/store instructions for the speculative execution success/failure prediction, and the number of entries of the speculative execution result history table 58 that have to be referred to for the prediction is at most 1. Therefore, the speculative execution success/failure prediction can be carried out in a very short processing time and the operating frequency of the processor can be raised easily.

Further, the data dependence relationship detection device 57 of each processor which is employed in the second embodiment has the function for selecting threads to which the true dependence relationship detection should be carried out based on the thread order 41 supplied from the thread control section 54. Therefore, the detection of the true dependence relationship between threads can be conducted properly and correctly taking the thread order into consideration.

As set forth hereinabove, by the data dependence speculation control device in accordance with the present invention, when the data dependence speculative execution of an instruction is carried out, the speculative execution success/failure history of the past is referred to and thereby whether the speculative execution will succeed or fail is predicted. If the prediction is "success", the instruction is executed by means of the speculative execution. If the prediction is "failure", the speculative execution is canceled and the instruction is executed later in the program order by means of the non-speculative execution. Therefore, when the processor executes a memory operation instruction, whether the data dependence speculative execution of the memory operation instruction will succeed or fail is predicted, and the memory operation instruction is executed in the out-of-order execution speculatively with regard to the data dependence if the prediction is "success". If the prediction is "failure", the memory operation instruction is executed non-speculatively in the program order. For the function, the data dependence speculation control device includes storage means for storing the speculative execution success/failure history of the past, and the success/failure prediction of each data dependence speculative execution is carried out based on the speculative execution success/failure history.

By such operation of the data dependence speculation control device, memory operation instructions whose data dependence speculative execution success probability is low are executed non-speculatively in the program order, thereby the failure rate of the data dependence speculative execution is reduced, and furthermore, high-precision speculative execution success/failure prediction can be realized based on the success/failure results of the data dependence speculative execution of the past which has been carried out based on the success/failure prediction. Consequently, the program execution performance can be improved. The above effects of the present invention result from the following facts.

(1) If the data dependence speculative execution failed, the program execution performance generally gets worse due to the recovery process in comparison with the non-speculative execution in the program order. Therefore, executing each instruction non-speculatively in the program order is better for the program execution performance than executing the data dependence speculative execution to fail.

(2) Generally, a memory operation instruction (in a program) whose data dependence speculative execution failure rate of the past is high tends to fail in the next data dependence speculative execution, and a memory operation instruction (in a program) whose data dependence speculative execution success rate of the past is high tends to succeed in the next data dependence speculative execution. Therefore, the speculative execution success/failure prediction in accordance with the present invention is carried out based on the success/failure results of the data dependence speculative execution of the past (which has been carried out based on the success/failure prediction).

Also in the multithread parallel processing (parallel processing in units of threads) which is executed by a multiprocessor system in accordance with the present invention including two or more processors, when the data dependence speculative execution in units of threads is carried out, the speculative execution success/failure history of the past is referred to and thereby whether the current speculative execution will succeed or fail is predicted. If the prediction is "success", the instruction is executed by means of the speculative execution. If the prediction is "failure", the speculative execution is canceled and the instruction is executed later in the program order by means of the non-speculative execution, that is, the thread including the instruction is executed later non-speculatively in the program order.

Therefore, when each of the processors (which are executing threads in parallel (in the out-of-order execution)) executes a memory operation instruction speculatively with regard to the data dependence relationship between threads (i.e. data dependence relationship between instructions of threads), whether the data dependence speculative execution will succeed or not is predicted. If the prediction is "success", the memory operation instruction is executed speculatively in the out-of-order execution. If the prediction is "failure", the memory operation instruction is executed non-speculatively in the program order.

Also in the data dependence speculative execution in units of threads, the success/failure prediction of the speculative execution is carried out based on the speculative execution success/failure history (success/failure results) of the past. By such operation, instructions whose data dependence speculative execution success probability is low are executed non-speculatively. Therefore, also in the multi-thread parallel processing which is executed by a multiprocessor system, the failure rate of the speculative execution is reduced and thereby the program execution performance can be improved.

Further, by the data dependence speculation control device in accordance with the present invention, the target addresses of load instructions, which are used for the speculative execution success/failure prediction, are assigned to specific entries of the speculative execution result history table (speculative execution result history storage means) allowing overlapping ("alias"), by use of the hash function circuit, for example. Therefore, the need for storing all the target addresses of the executed load instructions is eliminated and address comparators for comparing the target addresses with target addresses of store instructions become unnecessary. Therefore, the hardware necessary for the speculative execution success/failure prediction can be minimized.

Furthermore, by allowing the "alias", the number of load instructions to which the speculative execution success/failure prediction can be carried out is not limited by the amount of hardware of the data dependence speculation control device. Therefore, the improvement of the program execution performance by use of the data dependence speculative execution can be attained with a small amount of hardware.

The speculative execution success/failure prediction can be carried out without the need of the target address comparison between load/store instructions, and the number of entries of the speculative execution result history table (speculative execution result history storage means) that have to be referred to for the prediction is at most 1, therefore, the speculative execution success/failure prediction can be executed in a very short processing time, thereby the speeding up of the operating frequency of the processor can be attained easily.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A processor having a function for executing memory operation instructions in out-of-order execution by means of speculative execution with regard to dependence relationships between the memory operation instructions, comprising:
    address conversion means for converting a target address of a memory operation instruction into a corresponding entry number allowing the existence of aliases;
    speculative execution result history storage means for storing history information concerning success/failure results of speculative execution of memory operation instructions of the past, with regard to each of a plurality of entry numbers;
    speculative execution success/failure prediction means for predicting whether speculative execution of a particular memory operation instruction that is going to be carried out will succeed or fail by referring to an entry of the speculative execution result history storage means corresponding to an entry number that is obtained by the address conversion means for a target address of the particular memory operation instruction;
    instruction execution means for executing the memory operation instructions;
    speculation control means for letting the instruction execution means execute the particular memory operation instruction in out-of-order execution by means of speculative execution if the prediction by the speculative execution success/failure prediction means is success while letting the instruction execution means execute the particular memory operation instruction in in-order execution by means of non-speculative execution if the prediction by the speculative execution success/failure prediction means is failure;
    speculative execution success/failure judgment means for judging whether speculative execution of the memory operation instructions has succeeded or failed by detecting the dependence relationships between the memory operation instructions; and
    speculative execution result history update means for updating the history information stored in the speculative execution result history storage means taking the judgment by the speculative execution success/failure judgment means into account.

2. A processor as claimed in claim 1, wherein:
    the speculative execution success/failure judgment means judges the success/failure of speculative execution when a store instruction is executed, by detecting a presence/absence of a true dependence relationship of the store instruction on load instructions that are posterior to the store instruction in program order and that have been executed by means of speculative execution, and
    the speculative execution result history update means increases an index concerning success probability of speculative execution as history information stored in an entry corresponding to a target address of the store instruction if the speculative execution success/failure judgment means judged that speculative execution has succeeded, while the speculative execution result history update means decreases the index as the history information if the speculative execution success/failure judgment means judged that speculative execution has failed.

3. A processor as claimed in claim 2, wherein the speculative execution success/failure judgment means detects the presence/absence of the true dependence relationship of the store instruction on the load instructions by comparing the target address of the store instruction with target addresses of the load instructions that have been stored in address buffers.

4. A processor as claimed in claim 1, wherein the address conversion means converts the target address into the entry number by extracting predetermined bits from the target address.

5. A processor as claimed in claim 1, wherein the address conversion means converts the target address into the entry number by applying logical operations to predetermined bits of the target address.

6. A processor as claimed in claim 5, wherein the address conversion means converts the target address into the entry number by applying XOR operations to predetermined bits of the target address.

7. A multiprocessor system including two or more processors for executing parallel processing in units of threads, comprising:

thread assignment means for assigning the threads to the processors so that the threads will be executed by the processors in parallel;

address conversion means for converting a target address of a memory operation instruction included in the threads into a corresponding entry number allowing the existence of aliases;

speculative execution result history storage means for storing history information concerning success/failure results of speculative execution of memory operation instructions of the past, with regard to each of a plurality of entry numbers;

speculative execution success/failure prediction means for predicting whether speculative execution of a particular memory operation instruction that is going to be carried out by a processor will succeed or fail by referring to an entry of the speculative execution result history storage means corresponding to an entry number that is obtained by the address conversion means for a target address of the particular memory operation instruction;

speculation control means for letting the processor execute the particular memory operation instruction in out-of-order execution by means of speculative execution if the prediction by the speculative execution success/failure prediction means is success while letting the processor execute the particular memory operation instruction in in-order execution by means of non-speculative execution if the prediction by the speculative execution success/failure prediction means is failure;

speculative execution success/failure judgment means for judging whether speculative execution of memory operation instructions has succeeded or failed by detecting dependence relationships between the memory operation instructions; and speculative execution result history update means for updating the history information stored in the speculative execution result history storage means taking the judgment by the speculative execution success/failure judgment means into account.

8. A multiprocessor system as claimed in claim 7, wherein:

each of the processors includes a speculative execution success/failure judgment means and a speculative execution success/failure judgment means of the processor judges the success/failure of speculative execution of load instructions that have been carried out by the processor when a store instruction is executed by another processor that is executing a thread that is prior in program order to a thread executed by the processor, by detecting a presence/absence of a true dependence relationship of the store instruction on the load instructions, and the speculative execution result history update means increases an index concerning success probability of speculative execution as history information stored in an entry corresponding to a target address of the store instruction if the speculative execution success/failure judgment means of the processor judge that speculative execution has succeeded, while the speculative execution result history update means decreases the index as the history information if the speculative execution success/failure judgment means of the processor judged that speculative execution has failed.

9. A multiprocessor system as claimed in claim 8, wherein the speculative execution success/failure judgment means of each processor detects the presence/absence of the true dependence relationship of the store instruction on the load instructions by comparing the target address of the store instruction with target addresses of the load instructions that have been stored in address buffers of the processor.

10. A multiprocessor system as claimed in claim 7, wherein the address conversion means converts the target address into the entry number by extracting predetermined bits from the target address.

11. A multiprocessor system as claimed in claim 7, wherein the address conversion means converts the target address into the entry number by applying logical operations to predetermined bits of the target address.

12. A multiprocessor system as claimed in claim 11, wherein the address conversion means converts the target address into the entry number by applying XOR operations to predetermined bits of the target address.

13. A data dependence speculative execution method for executing memory operation instructions in out-of-order execution by means of speculative execution with regard to dependence relationships between the memory operation instructions, comprising the steps of:

an address conversion step for converting a target address of a memory operation instruction into a corresponding entry number allowing the existence of aliases;

a speculative execution result history storage step for storing history information concerning success/failure results of speculative execution of memory operation instructions of the past in history storage means, with regard to each of a plurality of entry numbers;

a speculative execution success/failure prediction step for predicting whether speculative execution of a particular memory operation instruction that is going to be carried out will succeed or fail by referring to an entry of the history storage means corresponding to an entry number that is obtained by the address conversion step for a target address of the particular memory operation instruction;

a speculative execution step for executing the particular memory operation instruction in out-of-order execution by means of speculative execution if the prediction by the speculative execution success/failure prediction step is success;

a non-speculative execution step for executing the particular memory operation instruction in in-order execution by means of non-speculative execution if the prediction by the speculative execution success/failure prediction step is failure;

a speculative execution success/failure judgment step for judging whether speculative execution of the memory operation instructions has succeeded or failed by detecting the dependence relationships between the memory operation instructions; and a speculative execution result history update step for updating the history information stored in the history storage means taking the judgment by the speculative execution success/failure judgment step into account.

14. A data dependence speculative execution method as claimed in claim 13, wherein:

in the speculative execution success/failure judgment step, the success/failure of speculative execution is judged when a store instruction is executed, by detecting a presence/absence of a true dependence relationship of the store instruction on load instructions that are posterior to the store instruction in program order and that have been executed by means of speculative execution, and in the speculative execution result history update step, an index concerning success probability of speculative execution as history information stored in an entry corresponding to a target address of the store instruction is increased if speculative execution is judged to have succeeded in the speculative execution success/failure judgment step, while the index as the history information is decreased if the speculative execution is judged to have failed in the speculative execution success/failure judgment step.

15. A data dependence speculative execution method as claimed in claim 14, wherein in the speculative execution success/failure judgment step, the presence/absence of the true dependence relationship of the store instruction on the load instructions is detected by comparing the target address of the store instruction with target addresses of the load instructions that have been stored in address buffers.

16. A data dependence speculative execution method as claimed in claim 13, wherein in the address conversion step, the target address is converted into the entry number by extracting predetermined bits from the target address.

17. A data dependence speculative execution method as claimed in claim 13, wherein in the address conversion step, the target address is converted into the entry number by applying logical operations to predetermined bits of the target address.

18. A data dependence speculative execution method as claimed in claim 17, wherein in the address conversion step, the target address is converted into the entry number by applying XOR operations to predetermined bits of the target address.

19. A data dependence speculative execution method for executing parallel processing in units of threads by executing memory operation instructions in out-of-order execution by means of speculative execution with regard to dependence relationships between the memory operation instructions, comprising the steps of:

a thread assignment step for assigning the threads to two or more processors so that the threads will be executed by the processors in parallel;

an address conversion step for converting a target address of a memory operation instruction included in the threads into a corresponding entry number allowing the existence of aliases;

a speculative execution result history storage step for storing history information concerning success/failure results of speculative execution of memory operation instructions of the past in history storage means, with regard to each of a plurality of entry numbers;

a speculative execution success/failure prediction step for predicting whether speculative execution of particular memory operation instruction that is going to be carried out by a processor will succeed or fail by referring to an entry of the history storage means corresponding to an entry number that is obtained by the address conversion step for a target address of the particular memory operation instruction;

a speculative execution step for letting the processor execute the particular memory operation instruction in out-of-order execution by means of speculative execution if the prediction by the speculative execution success/failure prediction step is success;

a non-speculative execution step for letting the processor execute the particular memory operation instruction in in-order execution by means of non-speculative execution if the prediction by the speculative execution success/failure prediction step is failure;

a speculative execution success/failure judgment step for judging whether speculative execution of the memory operation instructions has succeeded or failed by detecting the dependence relationships between the memory operation instructions; and a speculative execution result history update step for updating the history information stored in the history storage means taking the judgment by the speculative execution success/failure judgment step into account.

20. A data dependence speculative execution method as claimed in claim 19, wherein:

the speculative execution success/failure judgment step is executed for each processor, in which the success/failure of speculative execution of load instructions that have been carried out by the processor is judged when a store instruction is executed by another processor that is executing a thread that is prior in program order to a thread executed by the processor, by detecting a presence/absence of a true dependence relationship of the store instruction on the load instructions, and in the speculative execution result history update step, an index concerning success probability of speculative execution as history information stored in an entry corresponding to a target address of the store instruction is increased if speculative execution is judged to have succeeded in the speculative execution success/failure judgment step, while the index as the history information is decreased if the speculative execution is judged to have failed in the speculative execution success/failure judgment step.

21. A data dependence speculative execution method as claimed in claim 20, wherein in the speculative execution success/failure judgment step for each processor, the presence/absence of the true dependence relationship of the store instruction on the load instructions is detected by comparing the target address of the store instruction with target addresses of the load instructions that have been stored in address buffers of the processor.

22. A data dependence speculative execution method as claimed in claim 19, wherein in the address conversion step, the target address is converted into the entry number by extracting predetermined bits from the target address.

23. A data dependence speculative execution method as claimed in claim 19, wherein in the address conversion step, the target address is converted into the entry number by applying logical operations to predetermined bits of the target address.

24. A data dependence speculative execution method as claimed in claim 23, wherein in the address conversion step, the target address is converted into the entry number by applying XOR operations to predetermined bits of the target address.

* * * * *